US007764603B2

(12) United States Patent
Kawaguchi et al.

(10) Patent No.: US 7,764,603 B2
(45) Date of Patent: Jul. 27, 2010

(54) METHOD, APPARATUS, AND COMPUTER PRODUCT FOR SWITCHING RINGLETS

(75) Inventors: Junichi Kawaguchi, Fukuoka (JP);
Seishiro Taniguchi, Fukuoka (JP);
Katsumi Imamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 11/853,115

(22) Filed: Sep. 11, 2007

(65) Prior Publication Data
US 2008/0095044 A1    Apr. 24, 2008

(30) Foreign Application Priority Data
Oct. 19, 2006  (JP) ............................. 2006-285541

(51) Int. Cl.
*G01R 31/08*      (2006.01)
*H04L 12/26*     (2006.01)
*H04L 1/00*      (2006.01)
(52) U.S. Cl. ........................................ 370/225; 370/252
(58) Field of Classification Search .................. None
See application file for complete search history.

(56) References Cited

U.S. PATENT DOCUMENTS

2003/0233579 A1* 12/2003 Kimura et al. .............. 713/201

| 2005/0030961 | A1* | 2/2005 | Lee et al. ..................... 370/404 |
| 2005/0169629 | A1* | 8/2005 | Shioda et al. ................. 398/5 |
| 2006/0209683 | A1* | 9/2006 | Nishimura ................... 370/222 |
| 2007/0076755 | A1* | 4/2007 | Sato et al. .................... 370/468 |
| 2007/0121658 | A1* | 5/2007 | Acharya et al. ............. 370/403 |

FOREIGN PATENT DOCUMENTS

| JP | 02-274041  | 11/1990 |
| JP | 2005-354598 | 12/2005 |
| JP | 2006-262391 | 9/2006 |

* cited by examiner

*Primary Examiner*—Kevin C Harper
(74) *Attorney, Agent, or Firm*—Katten Muchin Rosenman LLP

(57) ABSTRACT

When a ringlet with a high frame transfer quality is selected as a switching candidate for each station of a transfer destination from information on frame transfer quality for each ringlet, when it is determined that a fundamental ringlet is in a preceding stage of degradation of the frame transfer quality from information on the frame transfer quality of the fundamental ringlet, and if the fundamental ringlet is different from the switching candidate, a ringlet for transferring a frame to a station of the transfer destination is switched from the fundamental ringlet to the switching candidate.

9 Claims, 26 Drawing Sheets

FIG.4

| | NUMBER OF HOPS | MAC ADDRESS |
|---|---|---|
| RINGLET 0 | 1 | STATION 2 MAC ADDRESS |
| | 2 | STATION 3 MAC ADDRESS |
| | 3 | STATION 4 MAC ADDRESS |
| | 4 | STATION 5 MAC ADDRESS |
| | 5 | STATION 6 MAC ADDRESS |
| | 6 | STATION 7 MAC ADDRESS |
| RINGLET 1 | 1 | STATION 7 MAC ADDRESS |
| | 2 | STATION 6 MAC ADDRESS |
| | 3 | STATION 5 MAC ADDRESS |
| | 4 | STATION 4 MAC ADDRESS |
| | 5 | STATION 3 MAC ADDRESS |
| | 6 | STATION 2 MAC ADDRESS |

| TRANSFER DESTINATION STATION | FUNDAMENTAL RINGLET |
|---|---|
| 2 | RINGLET 0 |
| 3 | RINGLET 0 |
| 4 | RINGLET 0 |
| 5 | RINGLET 1 |
| 6 | RINGLET 1 |
| 7 | RINGLET 1 |

(B)

| TRANSFER DESTINATION STATION | SWITCHING CANDIDATE | FUNDAMENTAL RINGLET |
|---|---|---|
| 2 | RINGLET 1 | RINGLET 0 |
| 3 | RINGLET 1 | RINGLET 0 |
| 4 | RINGLET 1 | RINGLET 0 |
| 5 | RINGLET 1 | RINGLET 1 |
| 6 | RINGLET 1 | RINGLET 1 |
| 7 | RINGLET 1 | RINGLET 1 |

FIG.8

| | Δt1 | Δt2 | Δt3 | FLOW AMOUNT ESTIMATION |
|---|---|---|---|---|
| Δrate0 | 10 | 15 | 20 | ESTIMATE THAT fa FRAME FLOW AMOUNT OF RINGLET 0 CONTINUES TO INCREASE |
| Δrate1 | 0 | 5 | 2 | ESTIMATE THAT fa FRAME FLOW AMOUNT OF RINGLET 1 IS NOT SUBSTANTIALLY CHANGED |
| LARGER INCREASING RATE | RINGLET 0 | RINGLET 0 | RINGLET 0 | →SWITCHING CANDIDATE IS RINGLET 1 |

FIG.9

| | Δt1 | Δt2 | Δt3 | FLOW AMOUNT ESTIMATION |
|---|---|---|---|---|
| Δrate0 | -10 | -15 | -20 | ESTIMATE THAT fa FRAME FLOW AMOUNT OF RINGLET 0 CONTINUES TO DECREASE |
| Δrate1 | 0 | 5 | 0 | ESTIMATE THAT fa FRAME FLOW AMOUNT OF RINGLET 1 IS NOT SUBSTANTIALLY CHANGED |
| LARGER INCREASING RATE | RINGLET 1 | RINGLET 1 | RINGLET 1 | |

FIG.12
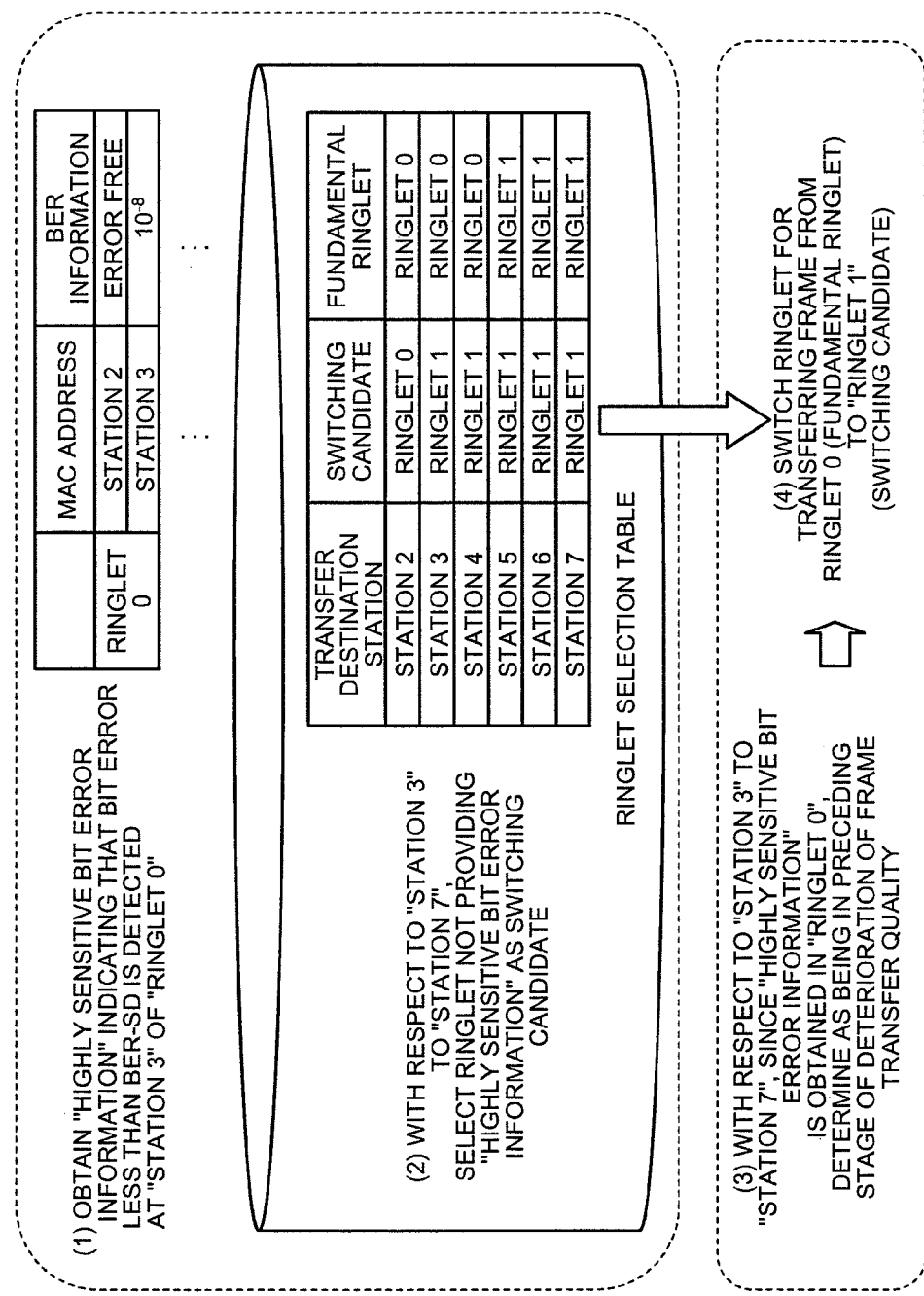
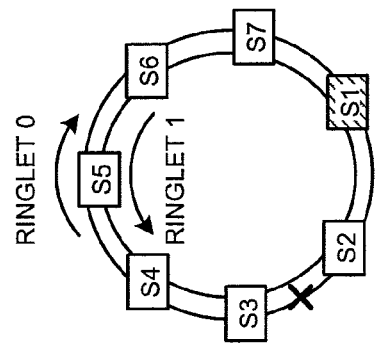

FIG.15

| | NUMBER OF HOPS | MAC ADDRESS | BER INFORMATION |
|---|---|---|---|
| RINGLET 0 | 1 | STATION 2 MAC ADDRESS | ERROR FREE |
| | 2 | STATION 3 MAC ADDRESS | $10^{-8}$ |
| | 3 | STATION 4 MAC ADDRESS | ERROR FREE |
| | 4 | STATION 5 MAC ADDRESS | ERROR FREE |
| | 5 | STATION 6 MAC ADDRESS | ERROR FREE |
| | 6 | STATION 7 MAC ADDRESS | ERROR FREE |
| RINGLET 1 | 1 | STATION 7 MAC ADDRESS | ERROR FREE |
| | 2 | STATION 6 MAC ADDRESS | ERROR FREE |
| | 3 | STATION 5 MAC ADDRESS | ERROR FREE |
| | 4 | STATION 4 MAC ADDRESS | ERROR FREE |
| | 5 | STATION 3 MAC ADDRESS | ERROR FREE |
| | 6 | STATION 2 MAC ADDRESS | ERROR FREE |

FIG.16

| TRANSFER DESTINATION STATION | SWITCHING CANDIDATE | FUNDAMENTAL RINGLET |
|---|---|---|
| 2 | RINGLET 0 | RINGLET 0 |
| 3 | RINGLET 1 | RINGLET 0 |
| 4 | RINGLET 1 | RINGLET 0 |
| 5 | RINGLET 1 | RINGLET 1 |
| 6 | RINGLET 1 | RINGLET 1 |
| 7 | RINGLET 1 | RINGLET 1 |

FIG.18
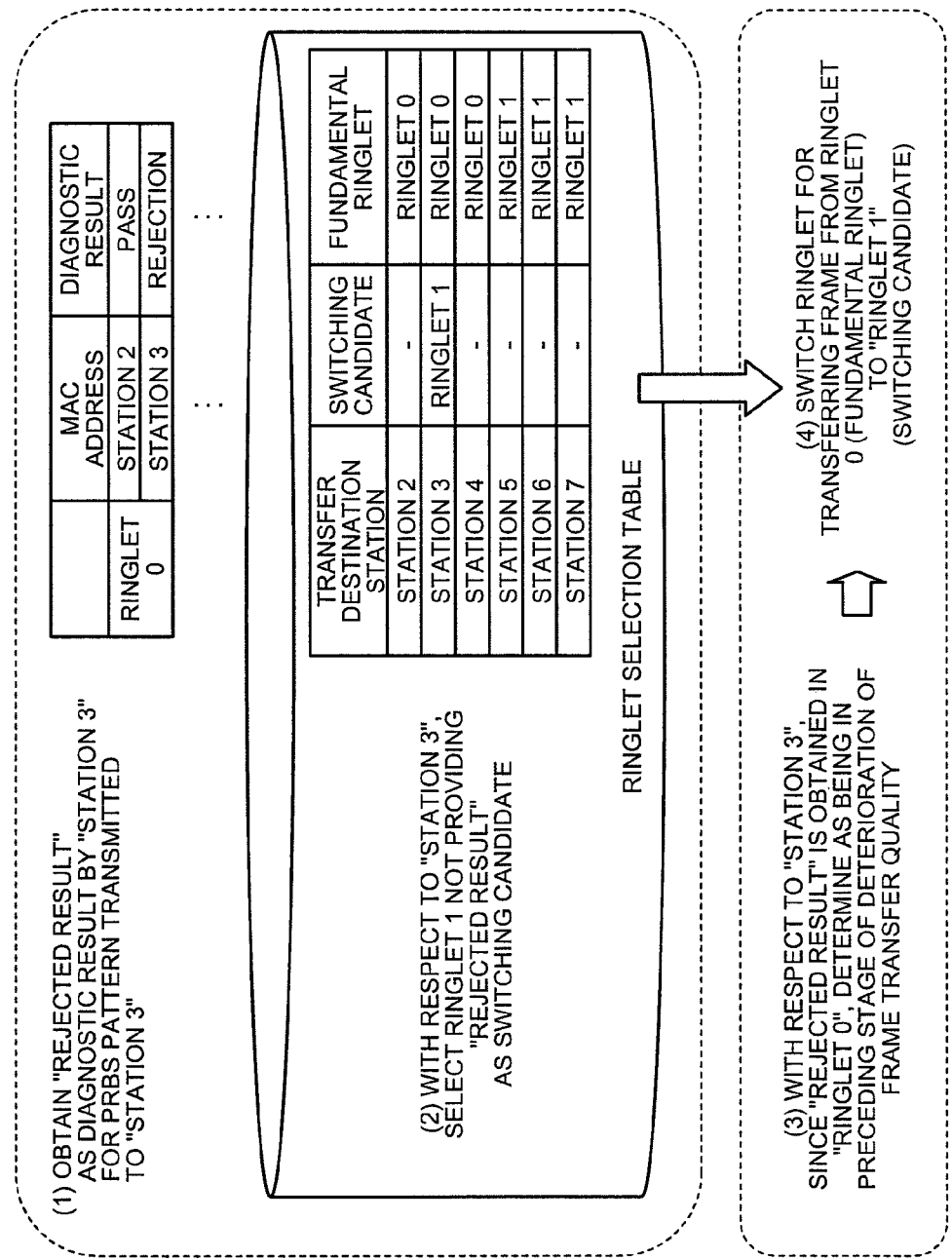
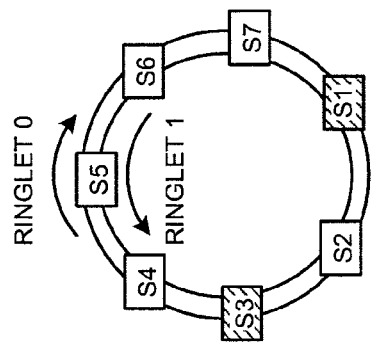

FIG.21

| | NUMBER OF HOPS | MAC ADDRESS | DIAGNOSTIC RESULT |
|---|---|---|---|
| RINGLET 0 | 1 | STATION 2 MAC ADDRESS | – |
| | 2 | STATION 3 MAC ADDRESS | REJECTION |
| | 3 | STATION 4 MAC ADDRESS | – |
| | 4 | STATION 5 MAC ADDRESS | – |
| | 5 | STATION 6 MAC ADDRESS | – |
| | 6 | STATION 7 MAC ADDRESS | – |
| RINGLET 1 | 1 | STATION 7 MAC ADDRESS | – |
| | 2 | STATION 6 MAC ADDRESS | – |
| | 3 | STATION 5 MAC ADDRESS | – |
| | 4 | STATION 4 MAC ADDRESS | – |
| | 5 | STATION 3 MAC ADDRESS | PASS |
| | 6 | STATION 2 MAC ADDRESS | – |

FIG.22

| TRANSFER DESTINATION STATION | SWITCHING CANDIDATE | FUNDAMENTAL RINGLET |
|---|---|---|
| 2 | - | RINGLET 0 |
| 3 | RINGLET 1 | RINGLET 0 |
| 4 | - | RINGLET 0 |
| 5 | - | RINGLET 1 |
| 6 | - | RINGLET 1 |
| 7 | - | RINGLET 1 |

FIG.26 (Related Art)

| TRANSFER DESTINATION STATION | RINGLET TO BE USED |
|---|---|
| 2 | RINGLET 0 |
| 3 | RINGLET 0 |
| 4 | RINGLET 0 |
| 5 | RINGLET 1 |
| 6 | RINGLET 1 |
| 7 | RINGLET 1 |

METHOD, APPARATUS, AND COMPUTER PRODUCT FOR SWITCHING RINGLETS

BACKGROUND OF THE INVENTION

1. Field of the Invention

The present invention relates to a technology for switching ringlets in a ring network configured with a plurality of ringlets.

2. Description of the Related Art

Conventionally, Resilient Packet Ring (RPR) has been paid attention to as a technology for constructing backbone networks owned by carriers or the like. As for a RPR composed of double ringlets, various functions, such as a function of selecting the ringlet, a function of using a ringlet bandwidth, and a function of switching to another ringlet upon occurrence of failures are specified by Institute of Electrical and Electronic Engineers (IEEE) (IEEE-802.17).

When specifically explaining the RPR, the ringlet of the RPR is configured by interconnecting a plurality of frame transfer apparatuses called "stations" to each other in a ring-type manner as shown in FIG. 25, and has a double ringlet configuration by doubly interconnecting adjacent "stations" to each other. These double ringlets mutually transfer frames in the opposite directions (refer to a ringlet 0 and a ringlet 1 in FIG. 25), wherein when the "station" transfers the frame to the "station" of a transfer destination, one ringlet of the double ringlets is selected for every "station" of the transfer destination as shown in FIG. 26, and the frame is transferred to the adjacent "station" by making use of the selected ringlet. Additionally, when a failure occurs in one ringlet, the "station" selects the other ringlet in which no failure occurs, and switches to the selected ringlet to transfer the frame to the adjacent "station".

Here, since one ringlet of the double ringlets is necessary to be selected in the RPR as explained above, a technique of selecting the ringlet and a technique of switching to the selected ringlet have been proposed. For example, as the technique of selecting the ringlet, IEEE 802.17 specifies a technique of selecting a ringlet having the fewer number of hops to the "station" of the transfer destination of the frame (the number of "stations" passed through the "station" of the transfer destination). As the technique of selecting and switching to the ringlet upon occurrence of failures, IEEE 802.17 also specifies a technique of selecting and switching to the ringlet so as not to pass through a section where the failure is caused.

Additionally, as the technique of selecting and switching the ringlet, a technique of selecting the other ringlet when the traffic amount of the ringlet having the fewer number of hops is not less than a threshold is disclosed in Japanese Patent No. 2005-354598, for example.

SUMMARY OF THE INVENTION

It is an object of the present invention to at least partially solve the problems in the conventional technology.

A ringlet switching apparatus according to one aspect of the present invention selects a ringlet for a station of a transfer destination of a frame and switches from a ringlet for transferring a frame to a selected ringlet in a station of double ringlets in which a plurality of stations are connected in a ring shape with double paths for bidirectionally transferring frames. The ringlet switching apparatus includes a switching candidate selecting unit that selects a ringlet having a high frame transfer quality as a switching candidate for each station of the transfer destination from information on frame transfer quality for each ringlet; and a switching unit that determines whether a fundamental ringlet that is a ringlet having a small station count to the transfer destination is in a preceding stage of a degradation of the frame transfer quality from the information on the frame transfer quality of the fundamental ringlet, and when it is determined that the fundamental ringlet is in the preceding stage of the degradation of the frame transfer quality, if the fundamental ringlet is different from the switching candidate selected by the switching candidate selecting unit, switches a ringlet for transferring the frame to the station of the transfer destination from the fundamental ringlet to the switching candidate.

A ringlet switching method according to another aspect of the present invention is for selecting a ringlet for a station of a transfer destination of a frame and switching from a ringlet for transferring a frame to a selected ringlet in a station of double ringlets in which a plurality of stations are connected in a ring shape with double paths for bidirectionally transferring frames. The ringlet switching method includes selecting a ringlet having a high frame transfer quality as a switching candidate for each station of the transfer destination from information on frame transfer quality for each ringlet; and switching including determining whether a fundamental ringlet that is a ringlet having a small station count to the transfer destination is in a preceding stage of a degradation of the frame transfer quality from the information on the frame transfer quality of the fundamental ringlet, and switching, when it is determined that the fundamental ringlet is in the preceding stage of the degradation of the frame transfer quality, if the fundamental ringlet is different from the switching candidate selected at the selecting, a ringlet for transferring the frame to the station of the transfer destination from the fundamental ringlet to the switching candidate.

A computer-readable recording medium according to still another aspect of the present invention stores therein a computer program for selecting a ringlet for a station of a transfer destination of a frame and switching from a ringlet for transferring a frame to a selected ringlet in a station of double ringlets in which a plurality of stations are connected in a ring shape with double paths for bidirectionally transferring frames. The computer program causes a computer to execute selecting a ringlet having a high frame transfer quality as a switching candidate for each station of the transfer destination from information on frame transfer quality for each ringlet; and switching including determining whether a fundamental ringlet that is a ringlet having a small station count to the transfer destination is in a preceding stage of a degradation of the frame transfer quality from the information on the frame transfer quality of the fundamental ringlet, and switching, when it is determined that the fundamental ringlet is in the preceding stage of the degradation of the frame transfer quality, if the fundamental ringlet is different from the switching candidate selected at the selecting, a ringlet for transferring the frame to the station of the transfer destination from the fundamental ringlet to the switching candidate.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram for explaining a topology table section;

FIG. 5 is a diagram for explaining a ringlet selection table section;

FIG. 8 is a diagram for explaining a switching candidate selecting section;

FIG. 9 is a diagram for explaining a switching-back section;

FIG. 12 is a diagram for explaining an outline and features of a ringlet switching apparatus according to a second embodiment;

FIG. 15 is a diagram for explaining a topology table section in the second embodiment;

FIG. 16 is a diagram for explaining a ringlet selection table section after selecting the switching candidate in the second embodiment;

FIG. 18 is a diagram for explaining an outline and features of a ringlet switching apparatus according to a third embodiment;

FIG. 21 is a diagram for explaining the topology table section in the third embodiment;

FIG. 22 is a diagram for explaining the ringlet selection table section after selecting the switching candidate in the third embodiment;

FIG. 26 is a diagram for explaining the conventional technology.

DETAILED DESCRIPTION OF THE PREFERRED EMBODIMENTS

Exemplary embodiments of the present invention are explained in detail below with reference to the accompanying drawings. Hereinafter, essential terms used in the embodiments, a configuration and a processing procedure of a ringlet switching apparatus according to a first embodiment, and advantages of the first embodiment will be sequentially explained, and then other embodiments will be explained.

The "ringlet" used in the following embodiments constitutes a ring-type network based on Resilient Packet Ring (RPR). When specifically explaining the "ringlet" of the RPR, the "ringlet" is configured by connecting a plurality of frame transfer apparatuses called "stations" in the ring-type manner, and the double "ringlets" are configured by interconnecting the adjacent "stations" to each other in a double path manner as a whole. In addition, these double "ringlets" transfer the frames in the opposite directions.

As explained above, since the double "ringlets" of the RPR transfer the frames in the opposite directions, when the "station" constituting the "ringlet" transfers the frame to the "station" similarly constituting the "ringlet" as the transfer destination, the "station" selects either of the double "ringlets", and switches the ringlet for transferring the frame, to the selected "ringlet", thereby transferring the frame.

Here, a procedure for the "station" to select the "ringlet" is specified by the Institute of Electrical and Electronic Engineers (IEEE) (IEEE 802.17). According to IEEE 802.17, the "station" will select the ringlet having the fewer number of "stations" passed through the station of the transfer destination (the number of hops) (hereafter, "fundamental ringlet"), and switch the ringlet for transferring the frame, to the fundamental ringlet, thereby transferring the frame.

Originally, the RPR has not only an excellent failure recovery function but also other excellent functions in effective bandwidth use, such as a fairness function, spatial reuse and the like, and congestion control of the "ringlet". However, according to the selection method of the "ringlet" specified by IEEE 802.17, the fundamental ringlet is selected regardless of variation and the switching to the fundamental ringlet is performed regardless of the congestion state of the fundamental ringlet as explained above, and thus a sufficient effect in the effective bandwidth use or the congestion control would be not able to be obtained. For this reason, it becomes an important issue that how the "station" should select the "ringlet" and at what timing the switching to the selected ringlet should be performed.

Figure 1:
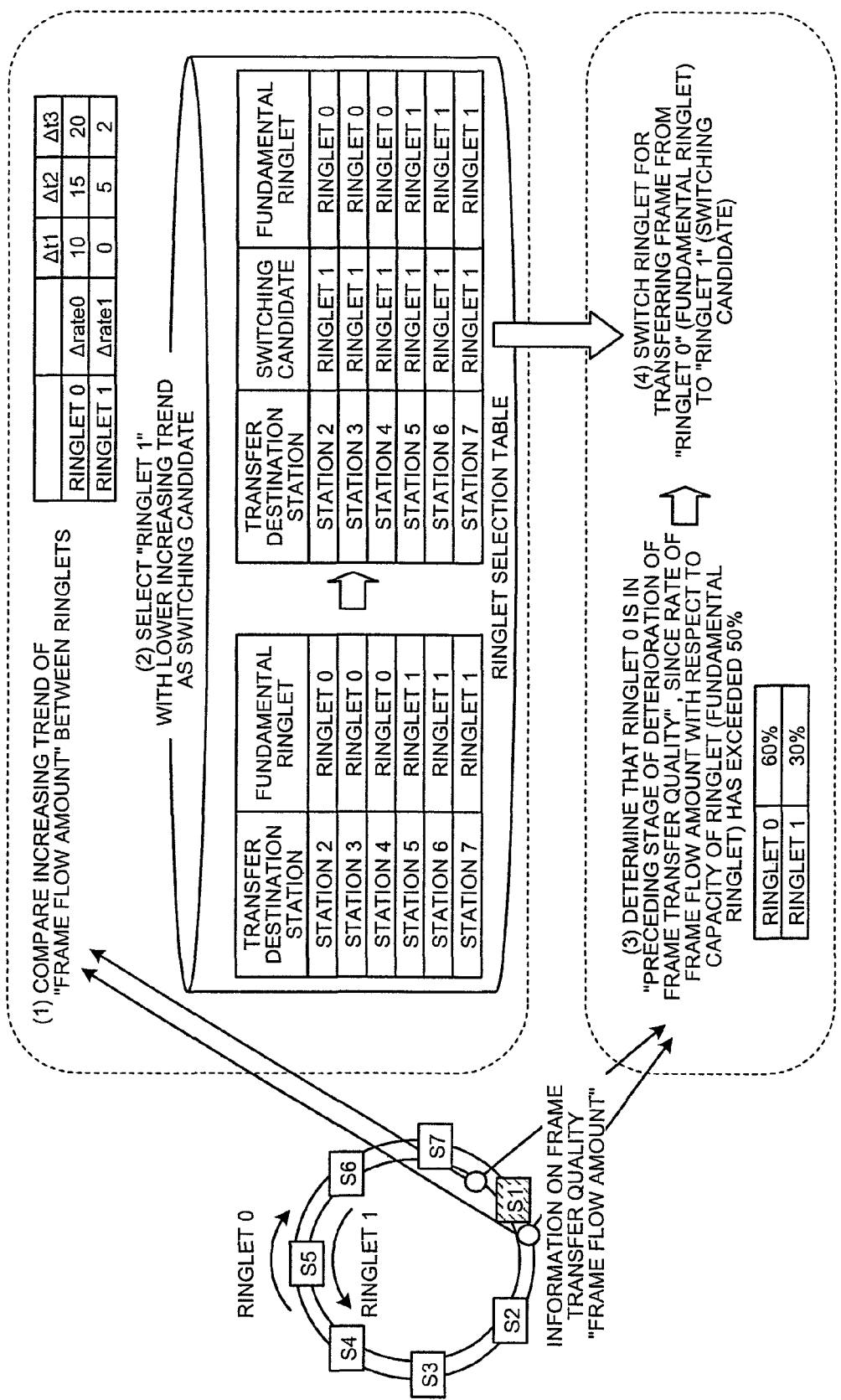
FIG. 1 is a diagram for explaining an outline and features of a ringlet switching apparatus according to a first embodiment.

FIG. 1 is a diagram for explaining the outline and features of the ringlet switching apparatus according to the first embodiment.

As explained above, in the station in the double ringlets in which a plurality of stations are connected in the ring-type manner with the double paths for transferring the frames in the opposite directions, the ringlet switching apparatus according to the first embodiment selects the ringlet for every station of the transfer destination of the frame, and switches the ringlet for transferring the frame to the selected ringlet, and the main feature is that the ringlet switching apparatus appropriately selects the ringlet having the higher frame transfer quality (the ringlet without the occurrence of the congestion or the ringlet without the occurrence of the failure) and switches to the selected ringlet at the appropriate timing (before the congestion occurs or before the failure occurs).

This main feature will be explained briefly. As shown in FIG. 1, in a "station 1 (S1)" in the double ringlets (the ringlet 0 and the ringlet 1) in which the stations of "station 1 (S1)" to "station 7 (S7)" are connected in the ring-type manner with the double paths for transferring the frames in the opposite directions, the ringlet switching apparatus selects the ringlet 0 or ringlet 1 for every station of the transfer destination of the frame, and switches the ringlet for transferring the frame to the selected ringlet 0 or ringlet 1.

Moreover, the ringlet switching apparatus associates and holds in advance, as a ringlet selection table, "the station of the transfer destination" and the "fundamental ringlet" having the fewer number of "stations" passed through the station of the transfer destination (the number of hops). For example, the ringlet having the fewer number of the stations passed through a "station 3" of "the station of the transfer destination" is the ringlet 0 (the number of hops is two, the number of hops for the ringlet 1 is five), and thus the ringlet switching apparatus associates and holds in advance, in the ringlet selection table, the "station 3" as "the station of the transfer destination" and the "ringlet 0" as "the fundamental ringlet".

In such a configuration, the ringlet switching apparatus according to the first embodiment selects the ringlet having the higher frame transfer quality as a switching candidate for every station of the transfer destination from information on frame transfer quality for every ringlet. Specifically, the ringlet switching apparatus according to the first embodiment uses, as the information on the frame transfer quality for every ringlet, the "frame flow rate" indicating the amount of transferred frames per unit time, compares an increasing trend of the "frame flow rate" between the ringlets, and selects the ringlet with the lower increasing trend as the switching candidate having the higher frame transfer quality.

For example, as shown in FIG. 1, when the increasing trend of the frame flow rate is compared between the ringlet 0 and the ringlet 1 from the increasing amount of the transferred frames (delta rate 0 and delta rate 1) per unit time (delta t1, delta t2, and delta t3) (refer to (1) of FIG. 1), the ringlet 1 is lower in the increasing trend, so that the ringlet switching apparatus selects the ringlet 1 as the switching candidate having the higher frame transfer quality (refer to (2) of FIG. 1). As shown in FIG. 1, the ringlet switching apparatus then associates and also holds the "switching candidate" in addition to the association between the "transfer destination station" and the "fundamental ringlet", which has been held in advance as the ringlet selection table.

Meanwhile, when the ringlet switching apparatus determines that the fundamental ringlet is in the preceding stage of the degradation of the frame transfer quality from the information on the frame transfer quality of the fundamental ringlet, if the fundamental ringlet is different from the selected switching candidate, the ringlet switching apparatus switches the ringlet for transferring the frame to the station of the transfer destination from the fundamental ringlet to the switching candidate. Specifically, when the ringlet switching apparatus according to the first embodiment determines that the fundamental ringlet is in the preceding stage of the degradation of the frame transfer quality since the rate of the frame flow rate with respect to the capacity of the fundamental ringlet has exceeded a first threshold, the ringlet switching apparatus switches the ringlet for transferring the frame from the fundamental ringlet to the switching candidate.

For example, when the ringlet switching apparatus determines that the rate of the frame flow rate with respect to the capacity of the fundamental ringlet (for example, the ringlet 0) is "60%", and the ringlet 0 is in the preceding stage of the degradation of the frame transfer quality because of exceeding the first threshold of, for example, "50%" (refer to (3) of FIG. 1) as shown in FIG. 1, if the fundamental ringlet (for example, the ringlet 0) is different from the selected switching candidate (when the selected switching candidate is the ringlet 1), the ringlet switching apparatus switches the ringlet for transferring the frame to the station of the transfer destination from the ringlet 0 to the ringlet 1 (refer to (4) of FIG. 1).

In this manner, the ringlet switching apparatus according to the first embodiment can appropriately select the ringlet having the higher frame transfer quality (the ringlet without the occurrence of the congestion or the ringlet without the occurrence of the failure) and can switch to the selected ringlet at the appropriate timing (before the congestion occurs or before the failure occurs).

Figure 2:
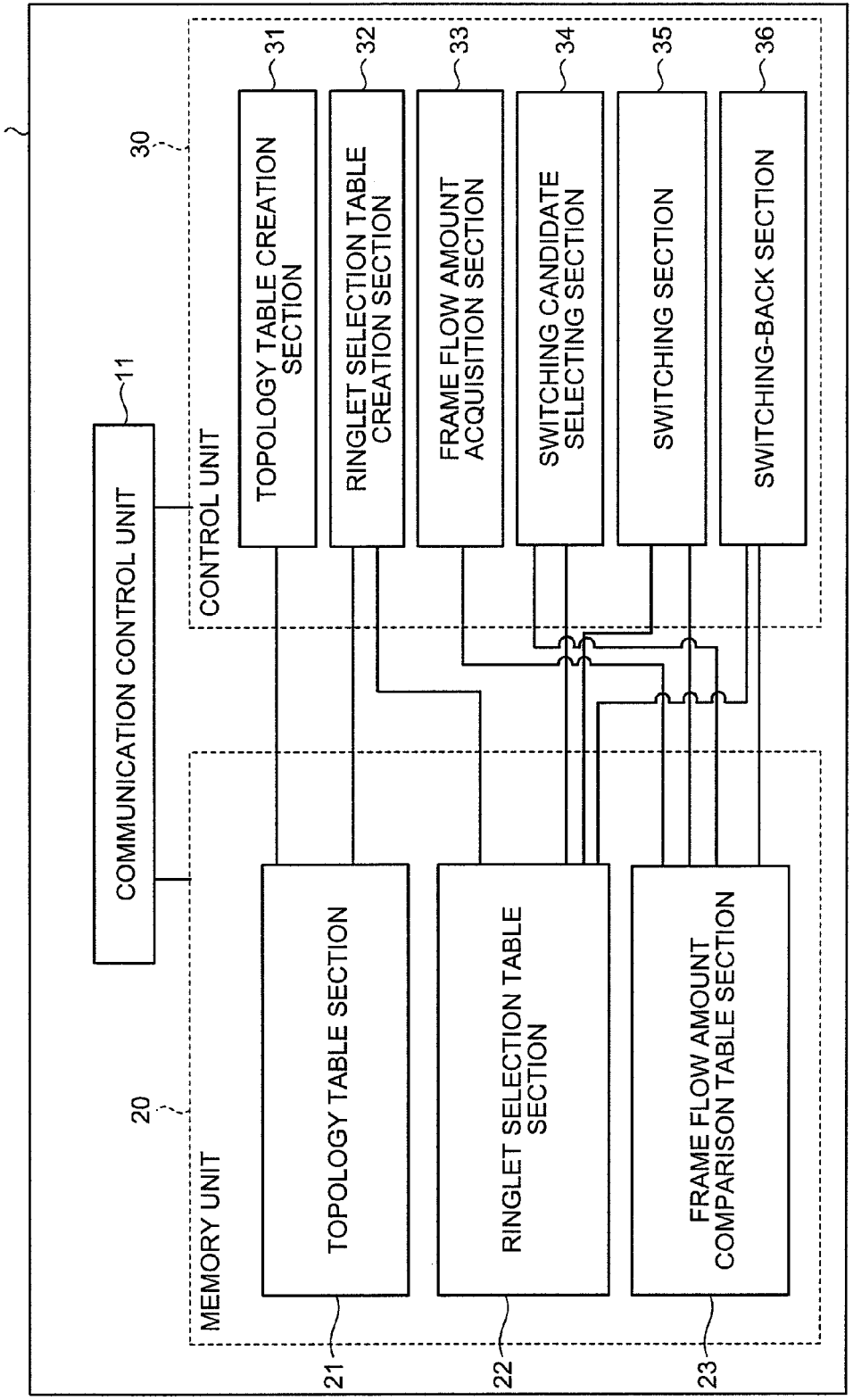
FIG. 2 is a block diagram showing a configuration of the ringlet switching apparatus according to the first embodiment.
Figure 3:
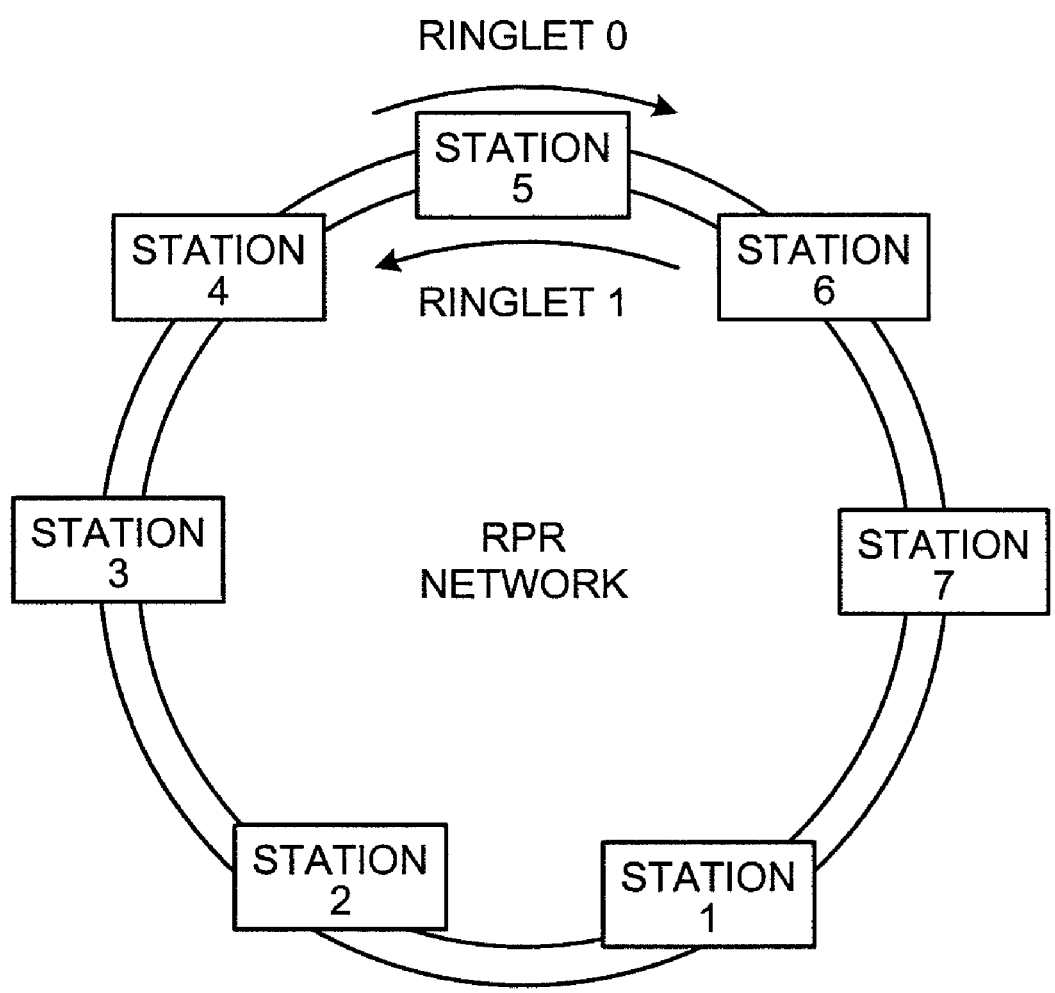
FIG. 3 is a diagram for explaining a network configuration in the first embodiment.
Figure 6:
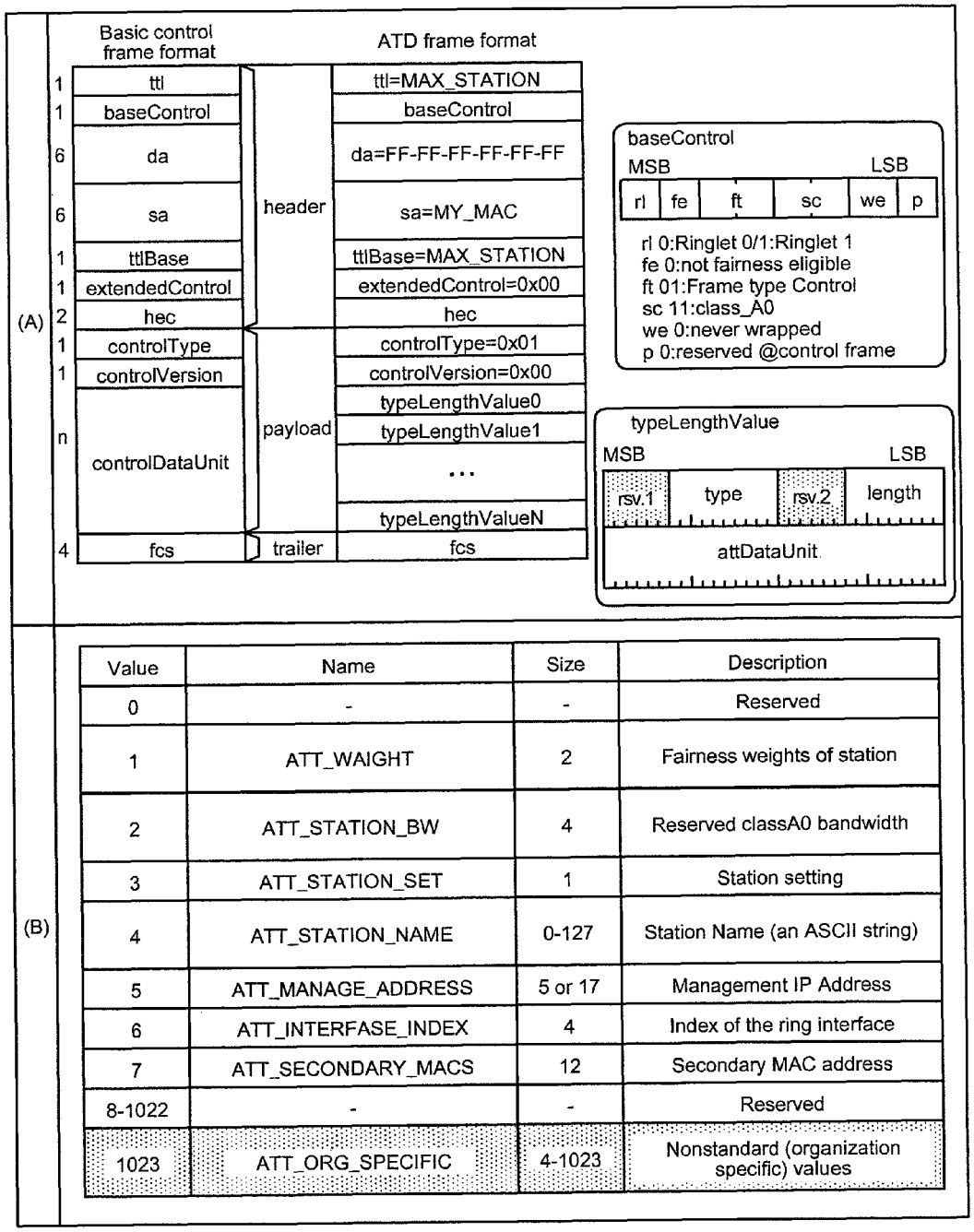
FIG. 6 is a diagram for explaining an ATD frame.
Figure 7:
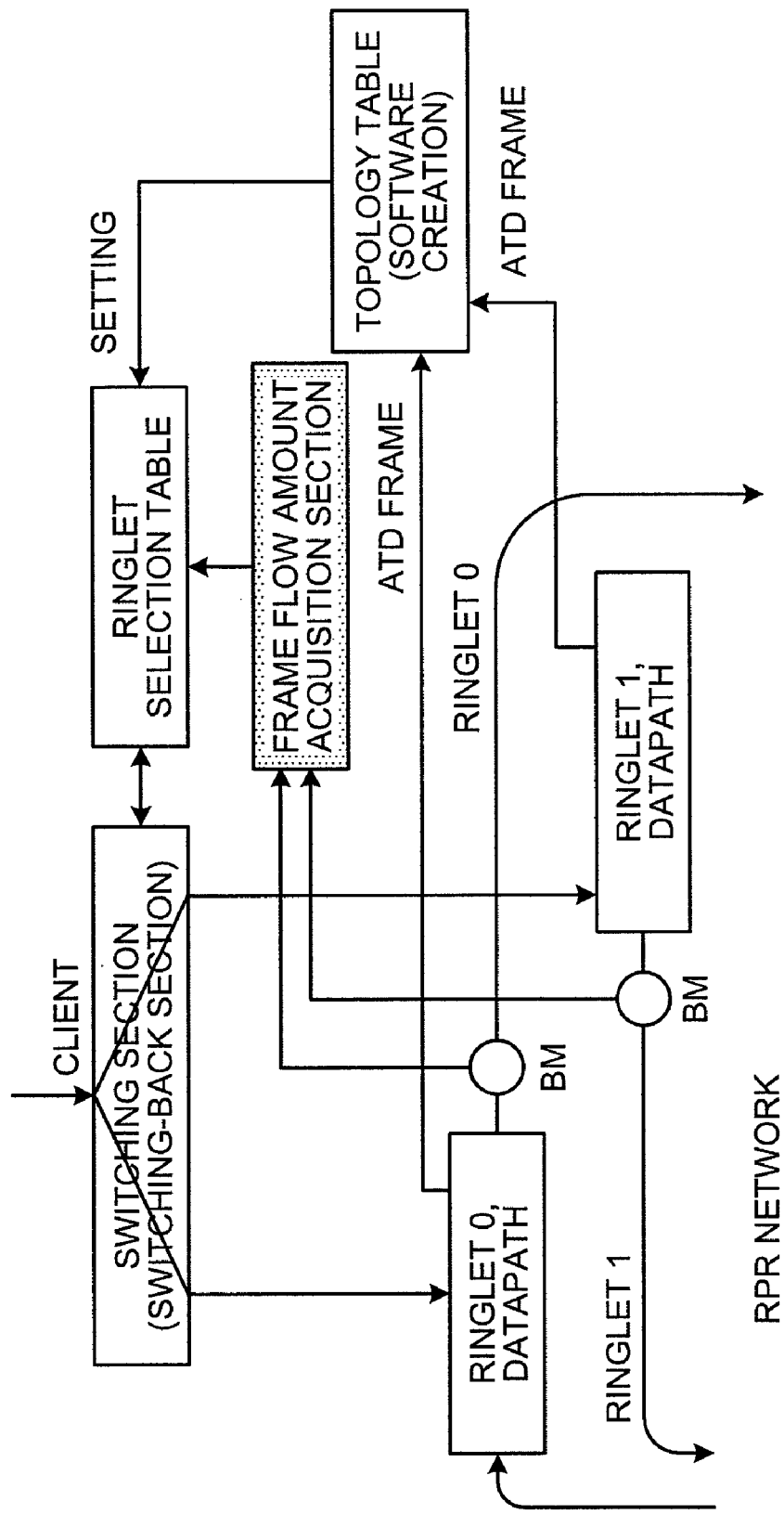
FIG. 7 is a diagram for explaining a frame flow rate acquisition section.

FIG. 2 is a block diagram showing the configuration of the ringlet switching apparatus according to the first embodiment. FIG. 3 is a diagram for explaining a network configuration in the first embodiment. FIG. 4 is a diagram for explaining a topology table section. FIG. 5 is a diagram for explaining a ringlet selection table section. FIG. 6 is a diagram for explaining an ATD frame. FIG. 7 is a diagram for explaining a frame flow rate acquisition section. FIG. 8 is a diagram for explaining a switching candidate selecting section. FIG. 9 is a diagram for explaining a switching-back section.

As shown in FIG. 2, the ringlet switching apparatus 10 is mainly composed of a communication control unit 11, a memory unit 20, and a control unit 30. Incidentally, there will be explained a case in which the ringlet switching apparatus 10 according to the first embodiment is realized as the "Station 1" constituting the RPR network (the ringlet 0 and the ringlet 1) shown in FIG. 3, but the present invention is not limited to this, the present invention can be also applied similarly to the case in which the ringlet switching apparatus is realized not as the station constituting the ringlet but as another apparatus that, for example, is connected to the station and controls the station to switch the ringlet.

In the ringlet switching apparatus 10 as the station, the communication control unit 11 transfers the frame to other stations constituting the ringlet, and so on. Specifically, when the communication control unit 11 receives the frame from the adjacent station, it checks "the information specifying the station of the transfer destination" included in the frame, obtains the information on the ringlet to be selected for "every station of the specified transfer destination" from a ringlet selection table section 22 that will be explained later, and so on, and then transfers the frame to the ringlet to be selected. Moreover, when the communication control unit 11 receives similarly the frame transmitted from a terminal (for example, a router or the like) connected to the ringlet switching apparatus 10, it checks "the information specifying the station of the transfer destination" included in the frame, and transfers the frame to the ringlet selected with the information on the ringlet selection table section 22.

The memory unit 20 stores data used for various kinds of processing by the control unit 30, and as sections especially related closely to the present invention, as shown in FIG. 2, it is provided with a topology table section 21, the ringlet selection table section 22, and a frame flow rate comparison table section 23.

The topology table section 21 has topology information that indicates a relation between the ringlet switching apparatus 10 as the station, and other stations constituting the ringlet. Specifically, the topology table section 21 holds a topology table created by a topology table creation section 31 that will be explained later, and the held topology table is used for processing or the like by a ringlet selection table creation section 32 that will be explained later. Incidentally, as explained above, the topology table held by the topology table section 21 shows the topology information on the stations constituting the ringlet, and thus unless the change in the configuration of the ringlet occurs, the topology table does not need to be changed. Accordingly, when the ringlet switching apparatus 10 as the station is connected to the ringlet and so on, the topology table section 21 is held in advance, and thereafter it is appropriately updated if needed, and so on.

For example, the topology table section 21 holds the topology table as shown in FIG. 4. As shown in FIG. 4, the topology table associates "the number of hops" (the number of hops) and "MAC address information" (MAC address), and holds them for every ringlet. The ringlet switching apparatus 10 according to the first embodiment is realized as the "Station 1" constituting the RPR network shown in FIG. 3, and thus, for example, for the "ringlet 0", the number of stations passed through the "Station 3" (the number of hops) is "2" (refer to the gray portion of FIG. 4), and for the "ringlet 1", the number of stations passed through the "Station 3" (the number of hops) is "5" (refer to the gray portion of FIG. 4).

The ringlet selection table section 22 holds the information for selecting the ringlet for every station of the transfer destination of the frame. Specifically, the ringlet selection table section 22 holds the ringlet selection table created by the ringlet selection table creation section 32 and a switching candidate selecting section 34 that will be explained later, and the held ringlet selection table is used for processing by a switching section 35 and a switching-back section 36 that will be explained later. Incidentally, as explained above, since the ringlet selection table held by the ringlet selection table section 22 shows the information for selecting the ringlet, it is appropriately updated depending on the state of the ringlet. Accordingly, when the ringlet switching apparatus 10 as the station is connected to the ringlet and so on, the ringlet selection table section 22 is held in advance, and thereafter is also updated appropriately if needed, and so on.

For example, the ringlet selection table section 22 holds the ringlet selection table as shown in FIG. 5. Typically, as shown in (A) of FIG. 5, the ringlet selection table associates and holds the "transfer destination station" and the "fundamental ringlet" that is the ringlet having the fewer number of stations passed through the station of the transfer destination (the fewer number of hops), in the ringlet selection table in the first embodiment, the "switching candidate" is selected by the switching candidate selecting section 34 that will be explained later and is added to the ringlet selection table, and as a result, as shown in (B) of FIG. 5, the ringlet selection table associates and holds the "transfer destination station", the "switching candidate" (switching candidate), and the "fundamental ringlet" (fundamental ringlet).

The frame flow rate comparison table section 23 holds, as the information on the frame transfer quality for every ringlet, the frame flow rate indicating the amount of frames transferred per unit time. Specifically, the frame flow rate comparison table section 23 holds the frame flow rate obtained by a frame flow rate acquisition section 33 that will be explained later for every ringlet, and the held frame flow rate is used for processing or the like by the switching candidate selecting section 34 that will be explained later. Incidentally, as explained above, a frame flow rate comparison table held by the frame flow rate comparison table section 23 indicates the amount of frames transferred per unit time, and thus it can be updated at any time.

The control unit 30 controls the ringlet switching apparatus 10 to perform various kinds of processing, and as sections especially related closely to the present invention, as shown in FIG. 2, it is provided with the topology table creation section 31, the ringlet selection table creation section 32, the frame flow rate acquisition section 33, the switching candidate selecting section 34, the switching section 35, and the switching-back section 36. Incidentally, the switching candidate selecting section 34 corresponds to "switching candidate selecting unit" according to claims, and the switching section 35 corresponds to "switching unit" according to claims.

The topology table creation section 31 creates the topology table held by the topology table section 21. Specifically, the topology table creation section 31 creates the topology table showing the relation between the ringlet switching apparatus 10 as the station and other stations constituting the ringlet, and causes the topology table section 21 to store the created topology table. Hereinafter, the method of creating the topology table by the topology table creation section 31 will be specifically explained.

Each station constituting the ringlet broadcasts MAC address information or the like of the station itself with Attribute discovery (ATD) frame. The ATD frame has a format as shown in (A) of FIG. 6 and is broadcasted to the other stations in the state in which the MAC address information or the like of the station itself (refer to "sa") is included in a "header. "Moreover, the ATD frame includes the information on "ttl" (Time To Live) and "ttlBase" in the "header" portion, and the station of the ATD frame sets up "255" for both. This "255" is subtracted by "1" in the "ttl" whenever it passes through one station, but is not subtracted in the "ttlBase. "Accordingly, at the station that has received the ATD frame, by subtracting the "ttl" value from the "ttlBase, the number of stations passed through the originating station of the ATD frame (the number of hops) can be obtained.

In this way, by receiving the ATD frame from each station, the topology table creation section 31 can obtain the number of stations passed through each station (the number of hops), and, as shown in FIG. 4, can create the topology table. Incidentally, the function for creating such a topology table is a function specified in IEEE 802.17.

The ringlet selection table creation section 32 creates the ringlet selection table held by the ringlet selection table section 22. Specifically, the ringlet selection table creation section 32 uses the topology table held by the topology table section 21 to create the ringlet selection table (the table for selecting the ringlet for every station of the transfer destination of the frame), and causes the ringlet selection table section 22 to store the created ringlet selection table. Hereinafter, the method of creating the ringlet selection table by the ringlet selection table creation section 32 will be specifically explained.

Each station constituting the ringlet creates the ringlet selection table as shown in (A) of FIG. 5 by using the topology table as shown in FIG. 4. For example, in the topology table of FIG. 4, the number of stations passed through the "Station 3" of the station of the transfer destination (the number of hops) is "2" in the ringlet 0, and is "5" in the ringlet 1. Accordingly, the ringlet selection table creation section 32 determines that the fundamental ringlet as the ringlet having the fewer number of stations passed through the "Station 3" of the station of the transfer destination is the ringlet 0, and as shown in (A) of FIG. 5, the "ringlet 0" is held as the "fundamental ringlet" in association with "3" in the "transfer destination station. "Meanwhile, in the topology table of FIG. 4, the number of stations passed through the "Station 5" of the station of the transfer destination (the number of hops) is "4" in the ringlet 0, and is "3" in the ringlet 1. Accordingly, the ringlet selection table creation section 32 determines that the fundamental ringlet as the ringlet having the fewer number of stations passed through the "Station 5" of the station of the transfer destination is the ringlet 1, and as shown in (A) of FIG. 5, the "ringlet 1" is held as the "fundamental ringlet" in association with "5" in the "transfer destination station".

The frame flow rate acquisition section 33 obtains the frame flow rate for every ringlet. Specifically, the frame flow rate acquisition section 33 obtains, as the information on the frame transfer quality for every ringlet, the frame flow rate indicating the amount of transferred frames per unit time, and causes the frame flow rate comparison table section 23 to store the obtained frame flow rate. For example, as shown in FIG. 7, by measuring the frame flow rate by a Byte Monitor (BM) section, the frame flow rate acquisition section 33 obtains the frame flow rate. Incidentally, in the RPR network, for the purpose of realizing a fairness function, the BM section has a function specialized by IEEE 802.17 to measure the flow amount of a "fairness eligible (fa) frame" (the frame in a class corresponding to the best effort).

From the information on the frame transfer quality for every ringlet, the switching candidate selecting section 34 selects the ringlet having the higher frame transfer quality as the switching candidate for every station of the transfer destination. Specifically, the switching candidate selecting section 34 in the first embodiment uses, as the information on the frame transfer quality for every ringlet, the frame flow rate held by the frame flow rate comparison table section 23, and compares the increasing trend of the frame flow rate between the ringlets to select the ringlet with the lower increasing trend as the switching candidate having the higher frame transfer quality, and causes the ringlet selection table section 22 to store the information on the selected switching candidate.

For example, the switching candidate selecting section 34 performs the selection as shown in FIG. 8. In the description for the example of FIG. 8, Columns of "delta t1", "delta t2", and "delta t3" show the frame flow rates of the "fa frame" measured at the BM section and show three counts for the frame flow rate transferred per delta t (unit time). Incidentally, as can be seen from the indications of the "delta rate 0" and the "delta rate 1", FIG. 8 shows not the frame flow rate itself measured at the BM section but a frame increasing amount per delta t (unit time) for every ringlet 0 (corresponding to the delta rate 0) and every ringlet 1 (corresponding to the delta rate 1). The switching candidate selecting section 34 calculates the information as shown in FIG. 8 from the information on the frame flow rate held by the frame flow rate comparison table section 23, and so on, so that it obtains the information needed for the processing of the switching candidate selection.

The switching candidate selecting section 34 compares the increasing trend of the frame flow rate between the ringlets, and selects the ringlet with the lower increasing trend as the switching candidate. For example, in the description for the example of FIG. 8, the "delta rate 0" indicating the frame increasing amount of the ringlet 0 increases from "10" to "15" to "20", with the passage of time, and the switching candidate selecting section 34 estimates as the estimation of the flow that "the fa frame flow rate of the ringlet 0 continues to increase from now on. "Meanwhile, the "delta rate 1" indicating the frame increasing amount of the ringlet 1 changes from "0" to "5" to "2" with the passage of time, and the switching candidate selecting section 34 estimates as the estimation of the flow that "the fa frame flow rate of the ringlet 1 is not substantially changed".

Moreover, when the switching candidate selecting section 34 compares the increasing trend of the frame flow rate between the ringlets for every delta t, the increasing rate in the "ringlet 0" is larger at the "delta t1", the increasing rate in the "ringlet 0" also is larger at the "delta t2", and the increasing rate in the "ringlet 0" further is larger at the "delta t3", and thus, as a result of comparing the increasing rate between the "delta rate 0" and the "delta rate 1", the ringlet in which the count determined as the "larger increasing rate" is fewer is the ringlet 1. Accordingly, the switching candidate selecting section 34 selects the "ringlet 1" as the switching candidate that is the ringlet with the lower increasing trend. Note herein that there has been explained the case in which the switching candidate selecting section 34 determines the ringlet with the lower increasing trend using three counts of frame increasing amounts in the first embodiment, but the present invention is not limited to this and can be applied to any case of determining it using one count of frame increasing amount or other counts of frame increasing amounts. Moreover, in the first embodiment, although there has been explained the case in which the switching candidate selecting section 34 determines the ringlet with the lower increasing trend using the count determined as the "larger increasing rate" in the frame increasing amount per unit time, but the present invention can be also applied similarly to a case by the other technique in which the ringlet with the lower increasing trend is determined by performing the estimation of the flow amount with any estimation technique.

The switching candidate selecting section 34 stores the switching candidate selected as explained above in the ringlet selection table section 22, as shown in (B) of FIG. 5. When describing it using an example in (B) of FIG. 5, if the station of the transfer destination is the "Station 3", the "fundamental ringlet" with the fewer number of stations passed through the station of the transfer destination is the "ringlet 0", but the "switching candidate" is the "ringlet 1".

The switching section 35 switches the ringlet for transferring the frame to the station of the transfer destination from the fundamental ringlet to the switching candidate. Specifically, when the switching section 35 in the first embodiment uses the frame flow rate held in the frame flow rate comparison table section 23 and determines that since the rate of the frame flow rate with respect to the capacity of the fundamental ringlet (the ringlet having the fewer number of stations passed through the station of the transfer destination) has exceeded the first threshold (for example, 50% or the like), the fundamental ringlet is in the preceding stage of the degradation of the frame transfer quality, if the fundamental ringlet is different from the switching candidate, the switching section 35, switches the ringlet for transferring the frame to the station of the transfer destination from the fundamental ringlet to the switching candidate.

For example, when the station of the transfer destination is the "Station 3", the switching section 35 retrieves the ringlet selection table section 22 in terms of the "Station 3", and as a result, since, as shown in (B) of FIG. 5, it becomes clear that the fundamental ringlet is the "ringlet 0", the switching section 35 then obtains the frame flow rate of the "ringlet 0" with reference to the frame flow rate comparison table section 23. Subsequently, when the switching section 35 determines that since the rate of the frame flow rate with respect to the capacity of the "ringlet 0" has exceeded, for example, 50%, the fundamental ringlet is the preceding stage of the degradation of the frame transfer quality, since the fundamental ringlet (the ringlet 0) is different from the switching candidate (the ringlet 1), the switching section 35 switches the ringlet for transferring the frame to the "Station 3" of the station of the transfer destination from the fundamental ringlet (the ringlet 0) to the switching candidate (the ringlet 1).

Meanwhile, the switching section 35 obtains the frame flow rate of the "ringlet 0" with reference to the frame flow rate comparison table section 23, and as a result, when the rate of the frame flow rate with respect to the capacity of the "ringlet 0" is, for example, less than 50%, as a case in which the fundamental ringlet is determined not to be in the preceding stage of the degradation of the frame transfer quality (the preceding stage of the congestion), the switching section 35 maintains the ringlet for transferring the frame to the "Station 3" of the station of the transfer destination to be the fundamental ringlet (the ringlet 0), and does not switch the ringlet. Incidentally, in the first embodiment, the technique using "50%" as the threshold of whether the fundamental ringlet is in the preceding stage of the degradation of the frame transfer quality has been explained, but the present invention is not limited to this and any threshold can be used if it is a suitable value for operation.

The switching-back section 36 switches back the ringlet for transferring the frame from the switching candidate to the fundamental ringlet. Specifically, when the ringlet for transferring the frame is switched from the fundamental ringlet to the switching candidate by the switching section 35, and thus the current ringlet for transferring the frame is the switching candidate, if the switching-back section 36 uses the frame flow rate held by the frame flow rate comparison table section 23, and compares the decreasing trend of the frame flow rate between the ringlets, and as a result, the ringlet with the higher decreasing trend is the fundamental ringlet, the switching-back section 36 switches back the ringlet for transferring the frame from the switching candidate to the fundamental ringlet if the rate of the frame flow rate with respect to the capacity of the fundamental ringlet does not exceed a second threshold (for example, 50% or the like).

For example, the switching-back section 36 performs the selection as shown in FIG. 9. FIG. 9 will be explained, The switching-back section 36 calculates the information as shown in FIG. 9 from the information on the frame flow rate held by the frame flow rate comparison table section 23, and so on, so that it obtains the information needed for the processing of switching-back.

First, the switching-back section 36 compares the decreasing tendency of the frame flow rate between the ringlets, and determines the ringlet with the higher decreasing tendency. For example, in the description for the example of FIG. 9, the "delta rate 0" indicating the frame increasing amount of the ringlet 0 decreases from "−10" to "−15" to "−20", with the passage of time, and the switching-back section 36 estimates as the estimation of the flow that "the fa frame flow rate of the ringlet 0 continues to be decreased from now on. "Meanwhile, the "delta rate 1" indicating the frame increasing amount of the ringlet 1 changes from "0" to "5" to "0" with the passage of time, and the switching-back section 36 estimates as the estimation of the flow that "the fa frame flow rate of the ringlet 1 is not substantially changed".

Moreover, when the switching-back section 36 compares the increasing tendency of the frame flow rate between the ringlets for every delta, the increasing rate in the "ringlet 1" is larger at the "delta t1", the increasing rate in the "ringlet 1" also is larger at the "delta t2", and the increasing rate in the "ringlet 1" further is larger at the "delta t3", and thus, as a result of comparing the increasing rate between the "delta rate 0" and the "delta rate 1", the ringlet in which the count determined as the larger increasing rate is fewer is the "ringlet 0". Accordingly, the switching-back section 36 selects the "ringlet 0" as the ringlet with the higher decreasing tendency. Incidentally, in the first embodiment, there has been explained the case in which the switching-back section 36 determines the ringlet with the higher decreasing trend using three counts of frame increasing amounts, but the present invention is not limited to this and can be applied to any case of determining it using one count of frame increasing amount or other counts of frame increasing amounts. Moreover, in the first embodiment, although there has been explained the case in which the switching-back section 36 determines the ringlet with the higher decreasing trend using the count determined as the "larger increasing rate" in the frame increasing amount per unit time, but the present invention can be also applied similarly to the case using another technique in which the ringlet with the higher decreasing trend is determined by performing the estimation of the flow amount with any estimation technique.

Figure 10:
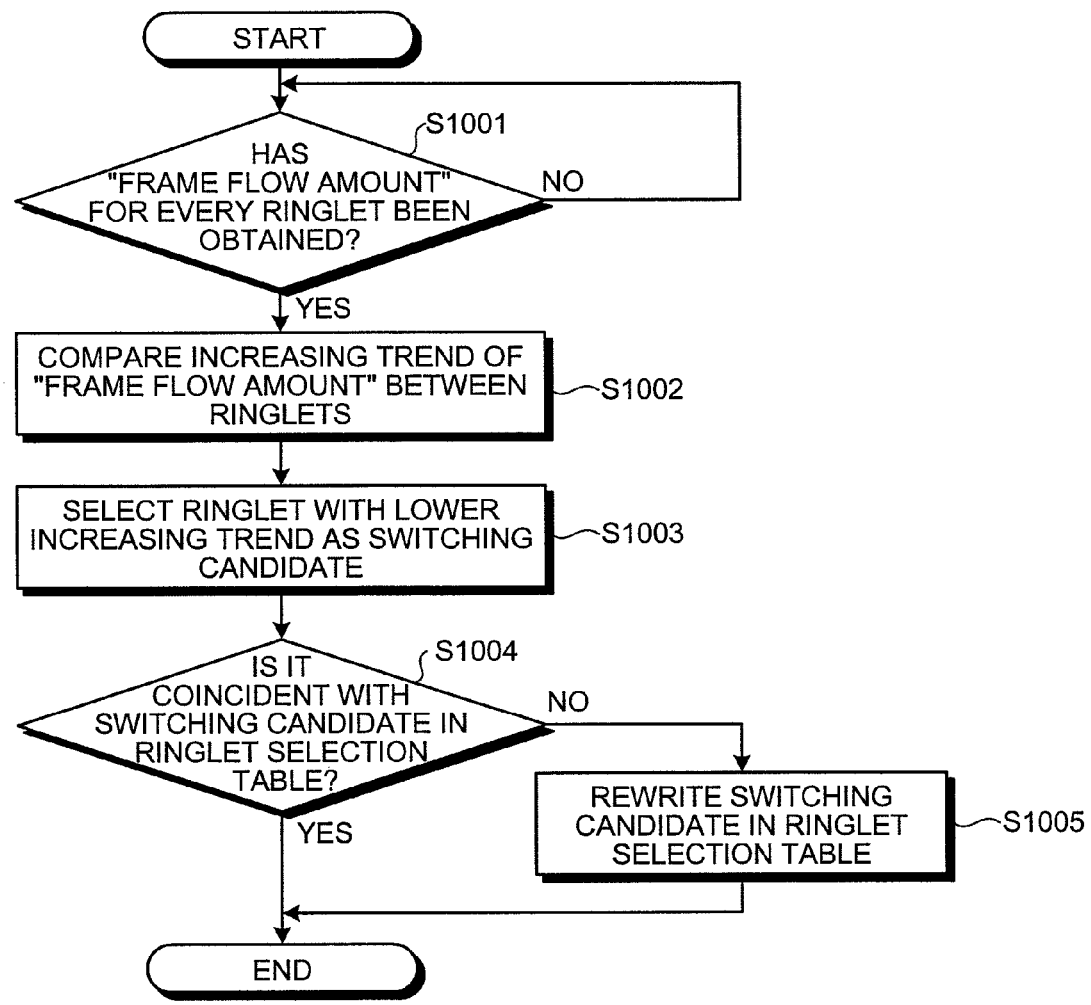
FIG. 10 is a flowchart showing a procedure of processing by the ringlet switching apparatus according to the first embodiment.
Figure 11:
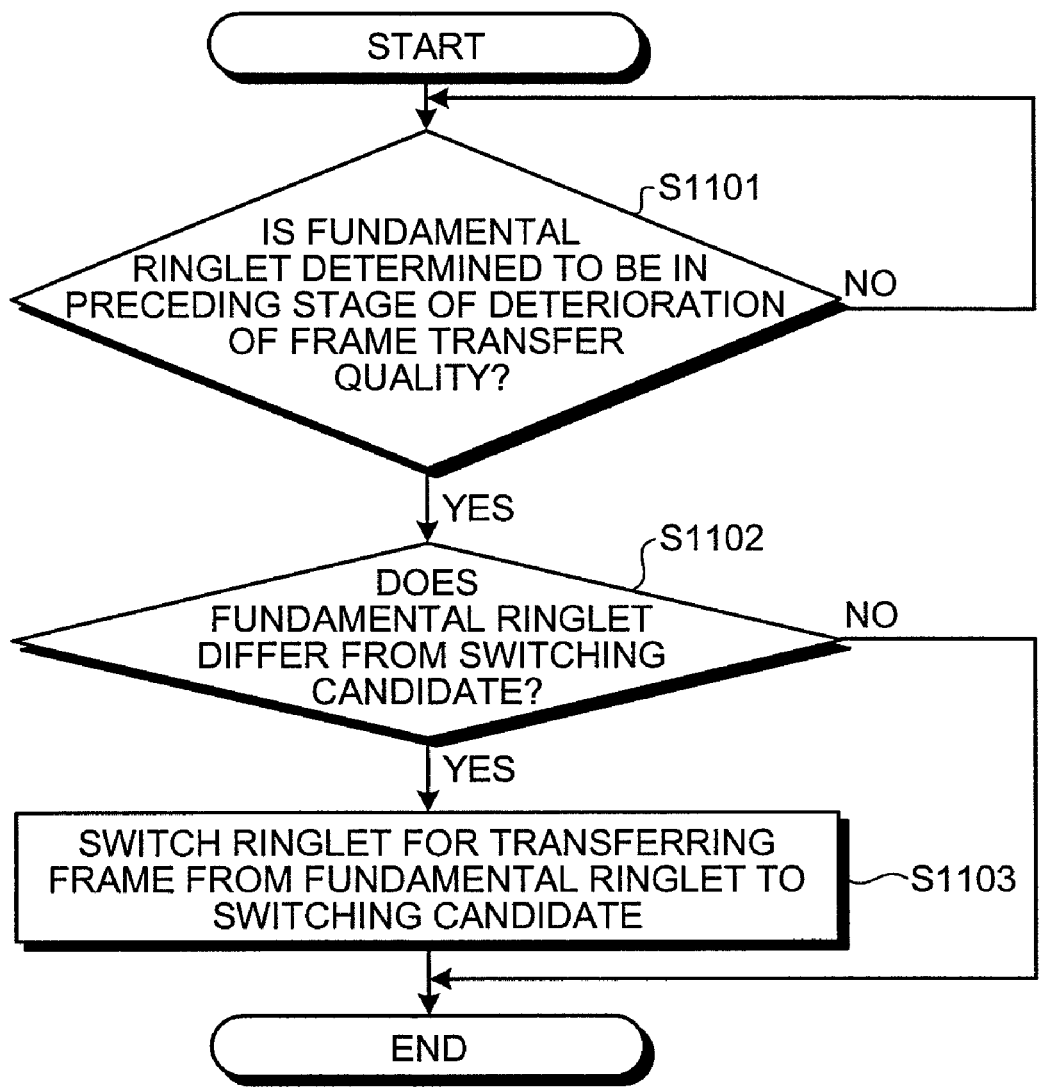
FIG. 11 is a flowchart showing a procedure of processing by the ringlet switching apparatus according to the first embodiment.

FIGS. 10 and 11 are flowcharts showing a procedure of processing by the ringlet switching apparatus according to the first embodiment. Incidentally, since in the processing by the ringlet switching apparatus according to the first embodiment, the switching candidate selection processing and the switching processing are separately performed, hereinafter, the switching candidate selection processing will be explained using FIG. 10 and the switching processing will be explained using FIG. 11.

First, the ringlet switching apparatus 10 according to the first embodiment determines whether the frame flow rate (the frame amount transferred per unit time) for every ringlet is obtained (step S1001). When the frame flow rate for every ringlet is not obtained (No at step S1001), the ringlet switching apparatus 10 returns to the process for determining whether the frame flow rate for every ringlet is obtained.

Meanwhile, when the frame flow rate for every ringlet is obtained (Yes at step S1001), the ringlet switching apparatus 10 compares the increasing trend of the frame flow rate between the ringlets (step S1002).

Next, the ringlet switching apparatus 10 selects the ringlet with the lower increasing trend of the frame flow rate as the switching candidate (step S1003).

The ringlet switching apparatus 10 then determines whether the selected switching candidate is coincident with the switching candidate in the ringlet selection table (step S1004), and when both are coincident (Yes at step S1004), the ringlet switching apparatus 10 completes the procedure. Meanwhile, when both are not coincident with each other (No at S1004), the ringlet switching apparatus 10 rewrites the switching candidate in the ringlet selection table (step S1005), and completes the procedure.

First, the ringlet switching apparatus 10 according to the first embodiment determines whether the fundamental ringlet is determined to be in the preceding stage of the degradation of the frame transfer quality (step S1101). When it is determined not to be in the preceding stage of the degradation (No at step S1101), the ringlet switching apparatus 10 returns to the process for determining whether it is in the preceding stage of the degradation.

Meanwhile, when the ringlet switching apparatus 10 has determined that it is in the preceding stage of the degradation (Yes at step S1101), it then determines whether the fundamental ringlet is different from the switching candidate (step S1102). When the fundamental ringlet is coincident with the switching candidate (No at step 1102), the ringlet switching apparatus 10 completes the procedure.

When the fundamental ringlet is different from the switching candidate (Yes at step S1102), the ringlet switching apparatus 10 switches the ringlet for transferring the frame from the fundamental ringlet to the switching candidate (step S1103).

In this manner, the ringlet switching apparatus 10 according to the first embodiment can appropriately select the ringlet having the higher frame transfer quality (the ringlet without the occurrence of the congestion or the ringlet without the occurrence of the failure) and can switch to the selected ringlet at the appropriate timing (before the congestion occurs or before the failure occurs).

As explained above, according to the first embodiment, in the station in the double ringlets in which stations are connected in the ring-type manner with the double paths for transferring the frames in the opposite directions, when the ringlet switching apparatus that selects the ringlet for every station of the transfer destination of the frame and switches the ringlet for transferring the frame to the selected ringlet, selects the ringlet having the higher frame transfer quality as the switching candidate for every station of the transfer destination from the information on the frame transfer quality for every ringlet, and determines that the fundamental ringlet is in the preceding stage of the degradation of the frame transfer quality from the information on the frame transfer quality of the fundamental ringlet (the ringlet having the fewer number of stations passed through the station of the transfer destination), if the fundamental ringlet is different from the switching candidate, since the ringlet switching apparatus switches the ringlet for transferring the frame to the station of the transfer destination from the fundamental ringlet to the switching candidate, it is possible to appropriately select the ringlet having the higher frame transfer quality (the ringlet without the occurrence of the congestion or the ringlet without the occurrence of the failure) and switch to the selected ringlet at the appropriate timing (before the congestion occurs or before the failure occurs).

Furthermore, according to the first embodiment, when the ringlet switching apparatus uses, as the information on the frame transfer quality for every ringlet, the frame flow rate indicating the amount of frames transferred per unit time, compares the increasing trend of the frame flow rate between the ringlets, to select the ringlet with the lower increasing trend as the switching candidate having the higher frame transfer quality, and determines that since the rate of the frame flow rate with respect to the capacity of the fundamental ringlet has exceeded the first threshold, the fundamental ringlet is in the preceding stage of the degradation of the frame transfer quality, since the ringlet switching apparatus switches the ringlet for transferring the frame from the fundamental ringlet to the switching candidate, it selects not the fundamental ringlet but the other ringlet with the fewer frame flow rate at the stage where the congestion may occur in a fundamental ringlet (the preceding stage of the degradation), and selects the fundamental ringlet at the stage where the congestion may not occur (a previous stage up to the preceding stage of the degradation), so that it is possible to appropriately select the ringlet having the higher frame transfer quality from the viewpoint of the effective use of bandwidth or the congestion control as compared with the conventional technique of selecting the fundamental ringlet (the ringlet having the fewer number of hops) regardless of the frame flow rate for every ringlet, and it is also possible to switch to the selected ringlet at the appropriate timing.

Moreover, according to the first embodiment, by controlling the ringlet switching using the frame flow rate for every ringlet, the increase in traffic is sensed earlier, and thus the switching to the selected ringlet at the more appropriate timing is possible from the viewpoint of the effective use of bandwidth or the congestion control.

Furthermore, according to the first embodiment, when the current ringlet for transferring the frame is the switching candidate by switching the ringlet for transferring the frame from the fundamental ringlet to the switching candidate, if the decreasing trend of the frame flow rate between the ringlets is compared and as a result, the ringlet with the higher decreasing trend is the fundamental ringlet, the ringlet switching apparatus switches back the ringlet for transferring the frame from the switching candidate to the fundamental ringlet if the rate of the frame flow rate with respect to the capacity of the fundamental ringlet does not exceed the second threshold, so that the fundamental ringlet is selected when the frame transfer quality of the fundamental ringlet has been improved, thereby it is possible to more appropriately select the ringlet having the higher frame transfer quality, and it is also possible to switch to the selected ringlet at the more appropriate timing.

As the first embodiment, the technique of using the frame flow rate (the frame amount transferred per unit time) as the information on the frame transfer quality and selecting the ringlet having the higher frame transfer quality as the switching candidate from the increasing trend of the frame flow rate has been explained so far. However, the present invention is not limited to this, and the present invention can also be applied similarly to the technique of using highly sensitive bit error information (information indicating that the bit error less than BER-SD is detected) as the information on the frame transfer quality and selecting the ringlet having the higher frame transfer quality as the switching candidate from the higher sensitivity bit error information. Hereinafter, as a second embodiment, the technique of using the highly sensitive bit error information as the information on the frame transfer quality will be explained.

FIG. 12 is a diagram for explaining the outline and features of the ringlet switching apparatus according to the second embodiment.

In the station of the double ringlet similar to that in the first embodiment, a ringlet switching apparatus according to the second embodiment selects the ringlet for every station of the transfer destination of the frame in a manner similar to the first embodiment, and switches the ringlet for transferring the frame to the selected ringlet, and the main feature is that the ringlet switching apparatus appropriately selects the ringlet with higher frame transfer quality and switches to the selected ringlet at the appropriate timing in a manner similar to the first embodiment.

This main feature will be explained briefly. The ringlet switching apparatus according to the second embodiment selects, in a manner similar to the first embodiment, the ringlet having the higher frame transfer quality as the switching candidate for every station of the transfer destination from the information on the frame transfer quality for every ringlet, but unlike the first embodiment, the ringlet switching apparatus uses, as the information on the frame transfer quality for every ringlet, the highly sensitive bit error information indicating that the bit error less than BER-SD is detected, and when the highly sensitive bit error information is obtained at the predetermined station of either of the ringlets, with respect to the predetermined station or other stations via the predetermined station in the ringlet, the ringlet switching apparatus selects the ringlet not providing the highly sensitive bit error information as the switching candidate having the higher frame transfer quality.

For example, as shown in FIG. 12, when the highly sensitive bit error information less than BER-SD is obtained by the "Station 3" of the ringlet 0 (refer to (1) of FIG. 12), because, with respect to the "Station 3" or the "Station 4" to "Station 7" that are other stations via the "Station 3" in the ringlet 0, the ringlet not providing the highly sensitive bit error information is the ringlet 1, the ringlet switching apparatus according to the second embodiment selects the ringlet 1 as the switching candidate having the higher frame transfer quality (refer to (2) of FIG. 12).

Meanwhile, when the ringlet switching apparatus determines in a similar manner to that of the first embodiment that the fundamental ringlet is in the preceding stage of the degradation of the frame transfer quality from the information on the frame transfer quality of the fundamental ringlet (however, in the second embodiment, the highly sensitive bit error information) (refer to (3) of FIG. 12) as shown in FIG. 12, if the fundamental ringlet is different from the selected switching candidate, the ringlet switching apparatus switches the ringlet for transferring the frame to the station of the transfer destination from the fundamental ringlet to the switching candidate (refer to (4) of FIG. 12).

Since the ringlet switching apparatus according to the second embodiment appropriately selects the ringlet having the higher frame transfer quality (the ringlet without a bit error) like this, and switches to the selected ringlet at the appropriate timing, (before protection starting based on the specification of IEEE 802.17 is performed), it is possible to decrease the frame discard as compared with the technique of independently performing the protection function based on the specification of IEEE 802.17.

Figure 13:
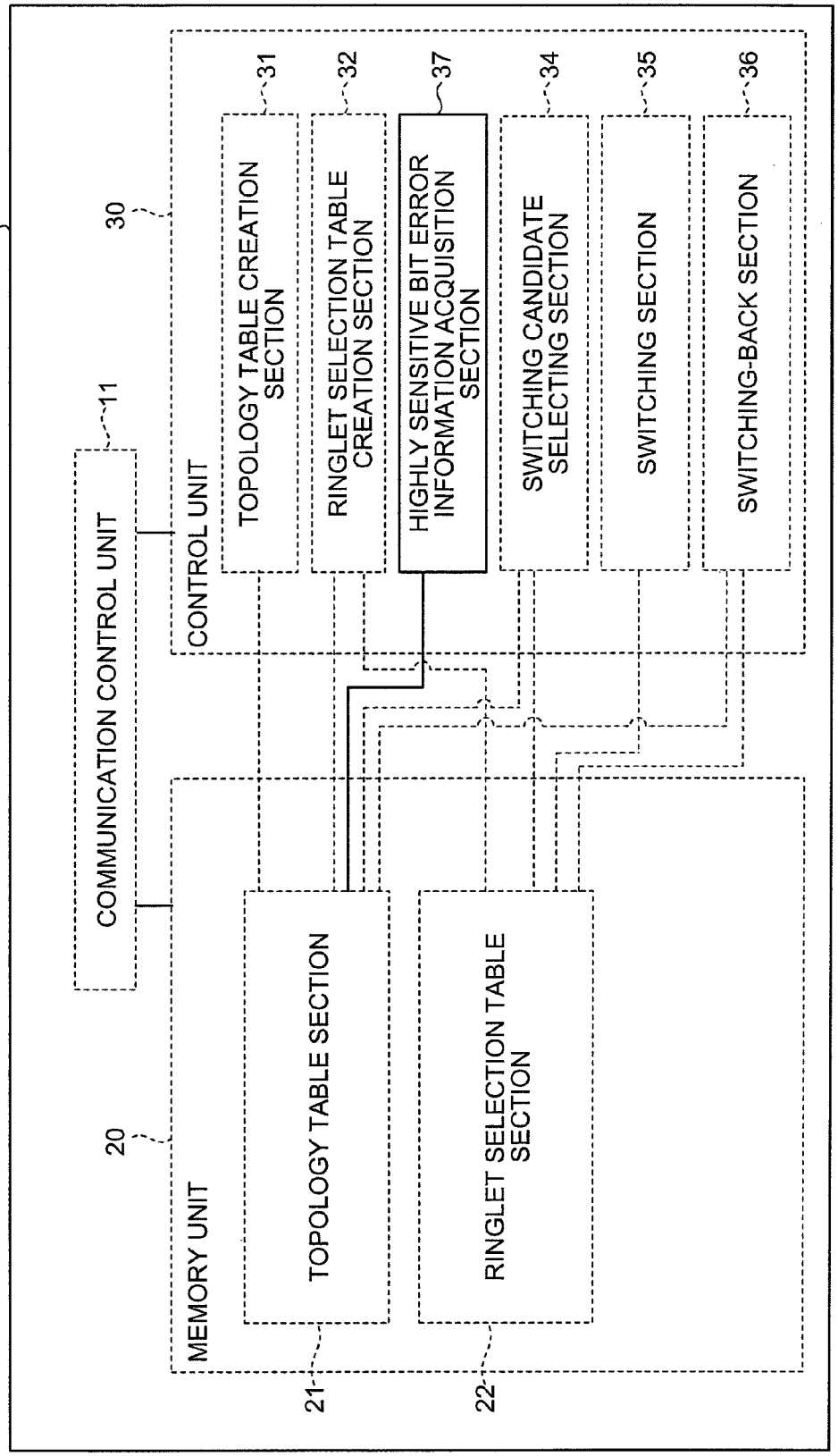
FIG. 13 is a block diagram showing a configuration of the ringlet switching apparatus according to the second embodiment.
Figure 14:
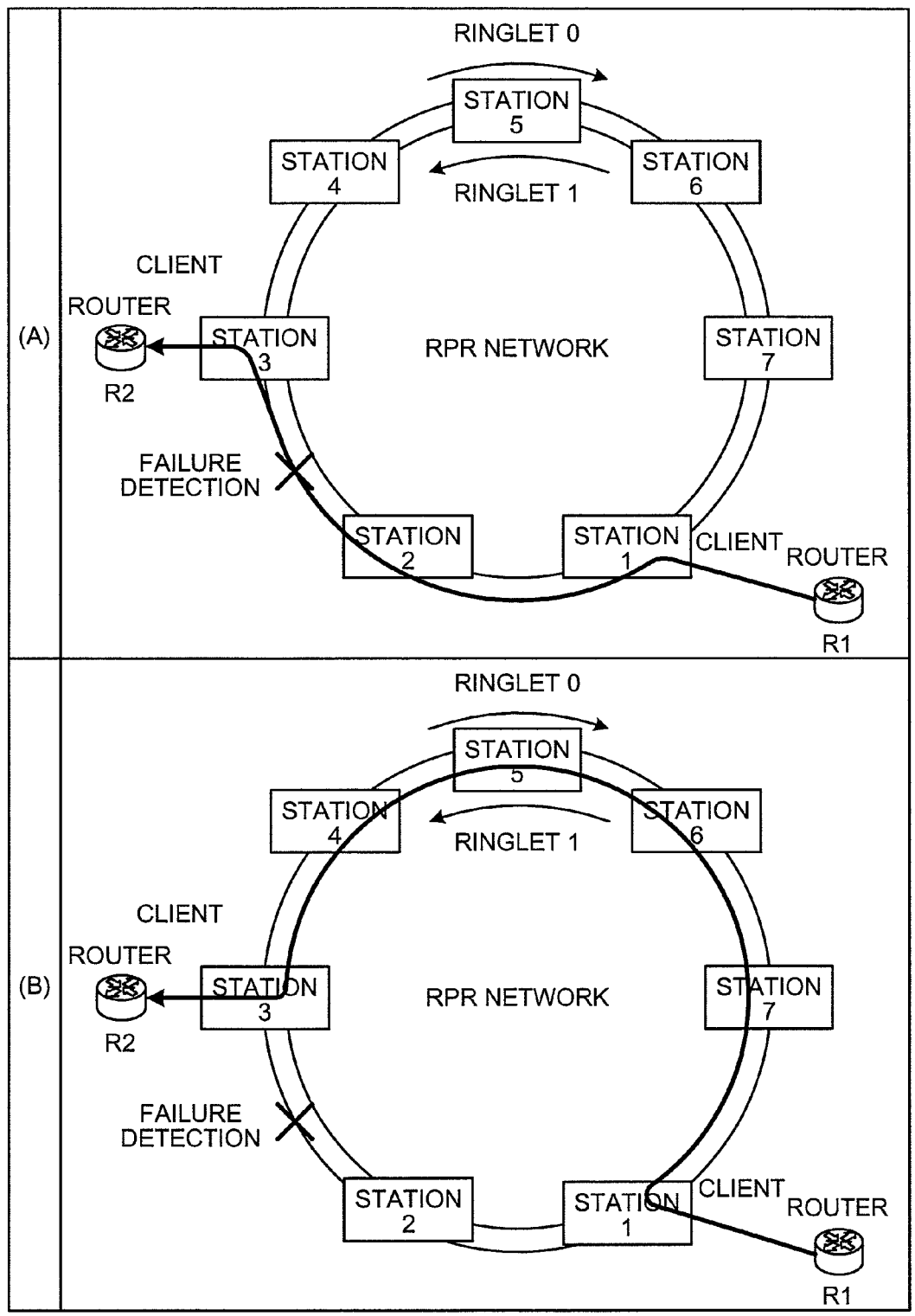
FIG. 14 is a diagram for explaining protection starting.

FIG. 13 is a block diagram showing the configuration of the ringlet switching apparatus according to the second embodiment. FIG. 14 is a diagram for explaining protection starting. FIG. 15 is a diagram for explaining a topology table section in the second embodiment. FIG. 16 is a diagram for explaining a ringlet selection table section after selecting the switching candidate in the second embodiment.

As shown in FIG. 13, the ringlet switching apparatus 10 according to the second embodiment is different from that according to the first embodiment in that it has a highly sensitive bit error information acquisition section 37. Hereinafter, the sections that perform operation different from that in the first embodiment, that is, the highly sensitive bit error information acquisition section 37 that is a primary focus of interest, the topology table section 21, the ringlet selection table section 22, the switching candidate selecting section 34, and the switching-back section 36 and the like will be explained.

The highly sensitive bit error information acquisition section 37 obtains the highly sensitive bit error information. Specifically, the highly sensitive bit error information acquisition section 37 obtains for itself the highly sensitive bit error information indicating that the bit error less than BER-SD is detected (in this case, it is notified to other stations) or obtains it by the notice from other station, and causes the topology table section 21 to store the obtained highly sensitive bit error information.

First, the bit error information and the protection function in the RPR network will be explained. In IEEE 802.17, with respect to the RPR network, the physical layer is not especially specialized, but from the circumstances that it is specified in consideration of the protection of Synchronous Optical Network (SONET) or Synchronous Digital Hierarchy (SDH), by measuring BER-SF or BER-SD of the SONET or the SDH, the protection in the RPR network is realized in many cases. The BER-SF means a bit error rate-signal fail, indicating that the failure has occurred in a transmission path. The BER-SD means a bit error rate-signal degrade, indicating that quality degradation has occurred in the transmission path.

The protection specialized by IEEE 802.17 includes "Wrap protection" and "Steer protection". The former is the protection in which the ringlet is turned back to the opposite ringlet at the both ends of the point (Edge) at which the failure has occurred, and hardware performs the protection. The latter is the protection in which the ringlet selection table is rewritten so as not to pass through the Edge, and software performs the protection. For example, as shown in FIG. 14, if the failure (or the quality degradation) occurs in the transmission path between the "Station 2" and the "Station 3" of the ringlet 0 (refer to (A) of FIG. 14), only the "Station 3" can detect it, and the "Station 3" performs the detection notice to the other stations using a TP frame, and then the "Station 3" and the other stations that has received the notice from the "Station 3" rewrite the ringlet selection tables so as not to pass through between the "Station 2" and "Station 3" of the ringlet 0. Accordingly, for example, when the "Station 1" performs the frame transfer to the "Station 3" as the transfer destination station, the ringlet for transferring the frame will be switched from the ringlet 0 to the ringlet 1 to thereby transfer the frame (refer to (B) of FIG. 14). Moreover, although IEEE 802.17 specializes that the protection should be performed from detecting the failure to switching the ringlet within "50 ms", the frame discard caused in the "50 ms" cannot be avoided.

In the protection of the SONET or the SDH, the threshold for detecting the BER-SF is set at a Default value of 10 to the −3rd power, and the Default value of the threshold for detecting the BER-SD is set at 10 to the −6th power. Accordingly, for example, in the case of the bit error less than "10 to the −6th power", the BER-SD is not detected and the TP frame notifies it as "IDLE (normal state)". However, it is considered that the frames discard due to an FCS error or the like is caused in the meantime. For this reason, the highly sensitive bit error information acquisition section 37 sets, as the highly sensitive bit error information, the bit error information indicating that the bit error less than the BER-SD (for example, the bit error of 10 to the −8th power) is detected, and obtains for itself the highly sensitive bit error information (in this case, it is notified to other stations), or obtains it by the notice from other station, The technique of notifying the highly sensitive bit error information to other stations will be specifically explained. The highly sensitive bit error information acquisition section 37 notifies the highly sensitive bit error information to other stations, for example using the ATD frame shown in FIG. 6. As shown in (B) of FIG. 6, in the Payload portion of the ATD frame, the "Organization Specific" field (ATT_ORG_SPECIFIC) unique to a vendor is prepared. The highly sensitive bit error information acquisition section 37 notifies the highly sensitive bit error information to other stations using this field, obtains the highly sensitive bit error information by the notice from other station, and uses the obtained highly sensitive bit error information to update the bit error information of the topology table held by the topology table section 21.

For example, as shown in FIG. 15, the topology table in the topology table section 21 updates the "BER information" by the highly sensitive bit error information received from the highly sensitive bit error information acquisition section 37. In the description for the example of FIG. 15, the highly sensitive bit error information is stored in the "BER information" corresponding to the "Station 3". This shows that the bit error less than BER-SD was caused between the "Station 2" and the "Station 3" of the ringlet 0, and the "Station 3" has not detected the BER-SD but has detected the highly sensitive bit error information. Incidentally, it is considered that even in the state where the BER-SD is not detected, the state of the frames discard due to the FCS error or the like is continued slightly, but it is less than the frames discard due to the protection starting. Moreover, "Error free" means a state where the bit error is not detected in the SONET or the SDH.

When the topology table in the topology table section 21 is updated as shown in FIG. 15, the ringlet selection table in the ringlet selection table section 22 will be updated as shown in FIG. 16. That is, since the highly sensitive bit error information is obtained by the "Station 3" of the ringlet 0, with respect to the "Station 3" or the "Station 4" to "Station 7" via the "Station 3" in the ringlet 0, the switching candidate selecting section 34 selects the ringlet 1 not providing the highly sensitive bit error information as the switching candidate having the higher frame transfer quality. As a result, in the ringlet switching apparatus according to the second embodiment, when the state of the "Error free" is changed to the bit error less than the BER-SD (before the protection is started), the ringlet to be selected is switched to the ringlet 1, and thus it is possible to suppress the frame discard.

Moreover, in a manner similar to the first embodiment, the switching-back section 36 in the second embodiment switches back the ringlet for transferring the frame from the switching candidate to the fundamental ringlet, but unlike the first embodiment, when the highly sensitive bit error information that is obtained at the predetermined station of the fundamental ringlet is updated to the error free information indicating that there is no error, the switching-back section 36 switches back the ringlet for transferring the frame from the switching candidate to the fundamental ringlet.

Figure 17:
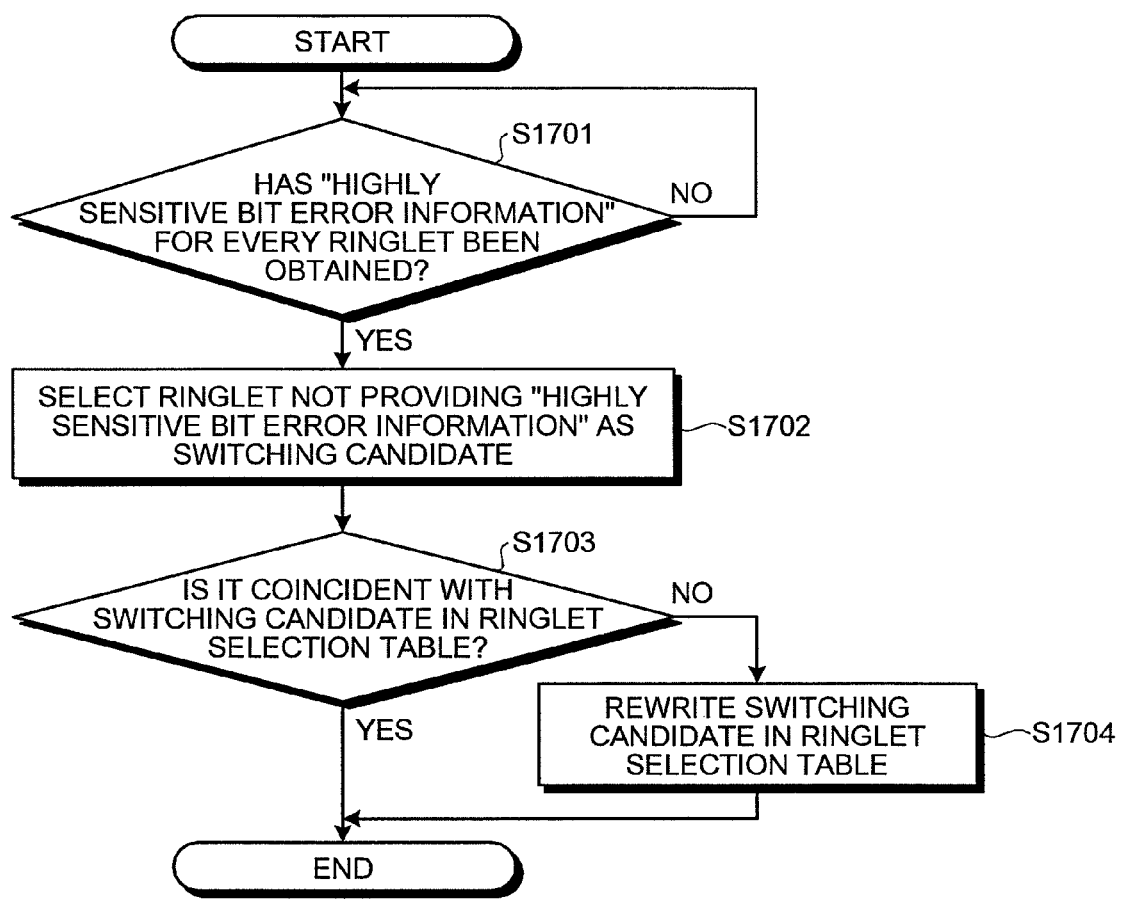
FIG. 17 is a flowchart showing a procedure of processing by the ringlet switching apparatus according to the second embodiment.

FIG. 17 is a flowchart showing a procedure of processing by the ringlet switching apparatus according to the second embodiment. Incidentally, since in the ringlet switching apparatus according to the second embodiment, the processing especially different from that in the first embodiment is the switching candidate selection processing, hereinafter, only the switching candidate selection processing will be explained.

First, the ringlet switching apparatus 10 according to the second embodiment determines whether the highly sensitive bit error information is obtained (the information indicating that the bit error less than the BER-SD is detected) for every ringlet (step S1701). When the highly sensitive bit error information for every ringlet is not obtained (No at step S1701), the ringlet switching apparatus 10 returns to the process for determining whether the frame flow rate for every ringlet is obtained.

Meanwhile, when the highly sensitive bit error information for every ringlet is obtained (Yes at step S1701), the ringlet switching apparatus 10 selects the ringlet not providing the highly sensitive bit error information as the switching candidate (step S1702).

The ringlet switching apparatus 10 then determines, in a manner similar to the first embodiment, whether the selected switching candidate is coincident with the switching candidate in the ringlet selection table (step S1703), and when both are not coincident with each other (No at step S1703), the ringlet switching apparatus 10 rewrites the switching candidate in the ringlet selection table (step S1704) and completes the procedure.

As explained above, according to the second embodiment the ringlet switching apparatus uses, as the information on the frame transfer quality for every ringlet, the highly sensitive bit error information indicating that the bit error less than the BER-SD is detected, and when the highly sensitive bit error information is obtained at the predetermined station of either of the ringlets, with respect to the predetermined station or other stations via the predetermined station in the ringlet, the ringlet switching apparatus selects the ringlet not providing the highly sensitive bit error information as the switching candidate having the higher frame transfer quality, and thus appropriately selects the ringlet having the higher frame transfer quality (the ringlet without the bit error) to switch to the selected ringlet at the appropriate timing (before the protection starting based on the specification of IEEE 802.17 is performed), so that as compared with the technique of independently performing the protection function based on the specification of IEEE 802.17, it is possible to decrease the frame discard.

Furthermore, according to the second embodiment, when the ringlet for currently transferring the frame is the switching candidate by switching the ringlet for transferring the frame from the fundamental ringlet to the switching candidate, if the highly sensitive bit error information that is obtained at the predetermined station of the fundamental ringlet is updated to the error free information indicating that there is no error, since the ringlet switching apparatus switches back the ringlet for transferring the frame from the switching candidate to the fundamental ringlet, the fundamental ringlet is selected when the frame transfer quality of the fundamental ringlet has been improved, so that it is possible to more appropriately select the ringlet having the higher frame transfer quality, and it is also possible to switch to the selected ringlet at the more appropriate timing.

As the first embodiment or the second embodiment, the technique of using the frame flow rate (the frame amount transferred per unit time) or the highly sensitive bit error information (the information indicating that the bit error less than BER-SD is detected) as the information on the frame transfer quality and selecting the ringlet having the higher frame transfer quality as the switching candidate from these information has been explained so far. However, the present invention is not limited to this, and the present invention can also be applied similarly to the technique of using a diagnostic result of the PRBS pattern as the information on the frame transfer quality and selecting the ringlet having the higher frame transfer quality as the switching candidate from the diagnostic result. Hereinafter, as a third embodiment, the technique of using the diagnostic result of the PRBS pattern as the information on the frame transfer quality will be explained.

FIG. 18 is a diagram for explaining the outline and features of the ringlet switching apparatus according to the third embodiment.

In the station of the double ringlet similar to that in the first embodiment, a ringlet switching apparatus according to the third embodiment selects the ringlet for every station of the transfer destination of the frame in a manner similar to the first embodiment, and switches the ringlet for transferring the frame to the selected ringlet, and the main feature is that the ringlet switching apparatus appropriately selects the ringlet with higher frame transfer quality and switches to the selected ringlet at the appropriate timing in a manner similar to the first embodiment.

This main feature will be explained briefly. The ringlet switching apparatus according to the third embodiment selects, in a manner similar to the first embodiment, the ringlet having the higher frame transfer quality as the switching candidate for every station of the transfer destination from the information on the frame transfer quality for every ringlet, but unlike the first embodiment, the ringlet switching apparatus uses, as the information on the frame transfer quality for every ringlet, the diagnostic result by the predetermined station for the PRBS pattern transmitted to the predetermined station for every ringlet, and if a rejected result is given, as the diagnostic result, to one of the ringlets, with respect to the predetermined station, the ringlet switching apparatus selects the ringlet not providing the rejected result as the switching candidate having the higher frame transfer quality.

For example, when the rejected result is obtained as the diagnostic result by the "Station 3" for the PRBS pattern transmitted to the "Station 3" (refer to (1) of FIG. 18) as shown in FIG. 18, since the ringlet not providing the rejected result is the ringlet 1 with respect to the "Station 3", the ringlet switching apparatus according to the third embodiment selects the ringlet 1 as the switching candidate having the higher frame transfer quality (refer to (2) of FIG. 18).

Meanwhile, when the ringlet switching apparatus determines in a similar manner to that of the first embodiment that the fundamental ringlet is in the preceding stage of the degradation of the frame transfer quality from the information on the frame transfer quality of the fundamental ringlet (however, in the third embodiment, the diagnostic result of the PRBS pattern) (refer to (3) of FIG. 18) as shown in FIG. 18, if the fundamental ringlet is different from the selected switching candidate, the ringlet switching apparatus switches the ringlet for transferring the frame to the station of the transfer destination from the fundamental ringlet to the switching candidate (refer to (4) of FIG. 18).

The ringlet switching apparatus according to the third embodiment appropriately selects the ringlet having the higher frame transfer quality (the ringlet for which the diagnostic result by the PRBS pattern is not the rejection) like this, and switches to the selected ringlet at the appropriate timing, (before the protection starting based on the specification of IEEE 802.17 is performed), so that it is possible to decrease the frame discard as compared with the technique of independently performing the protection function based on the specification of IEEE 802.17.

Figure 19:
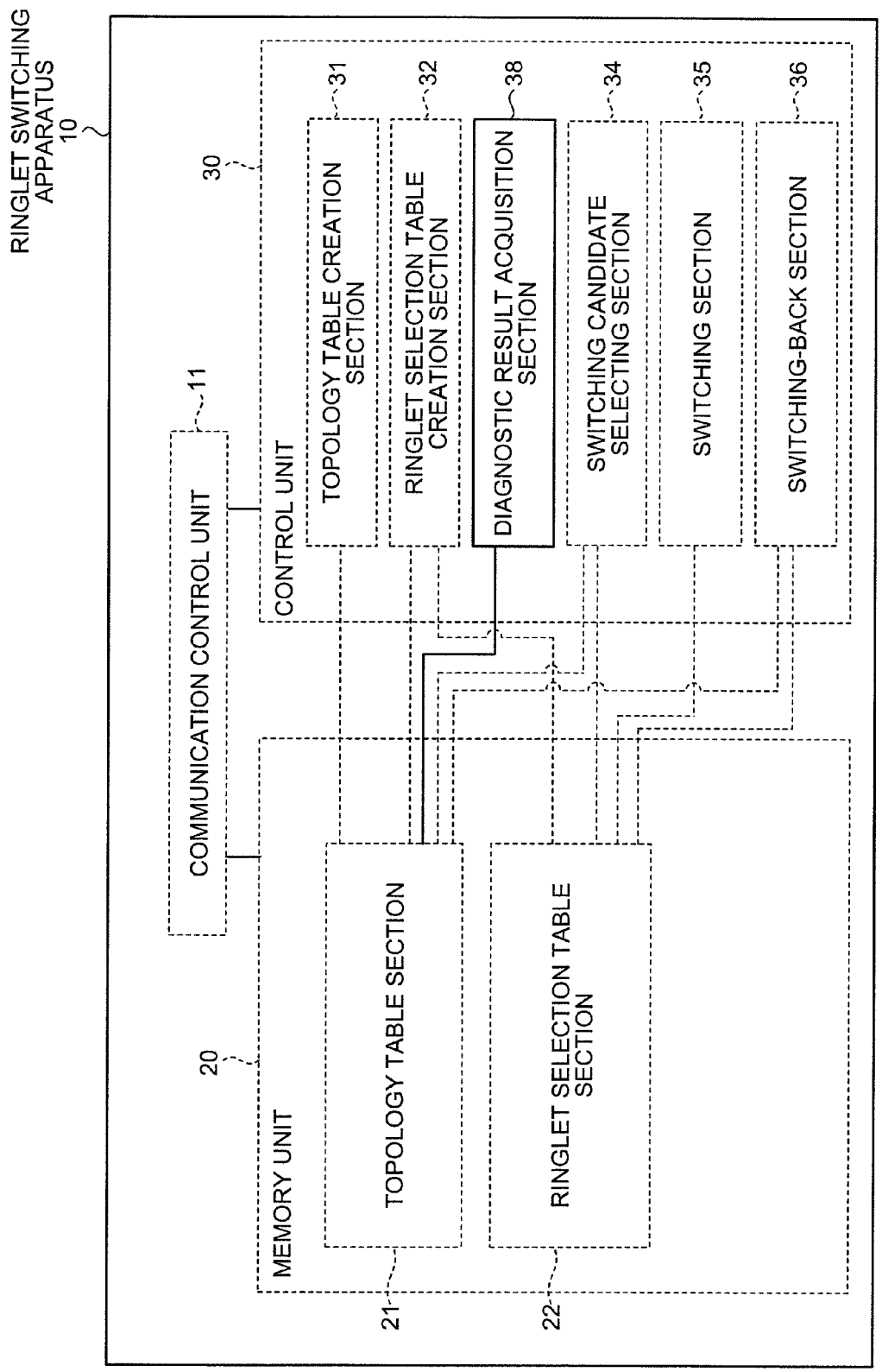
FIG. 19 is a block diagram showing a configuration of the ringlet switching apparatus according to the third embodiment.
Figure 20:
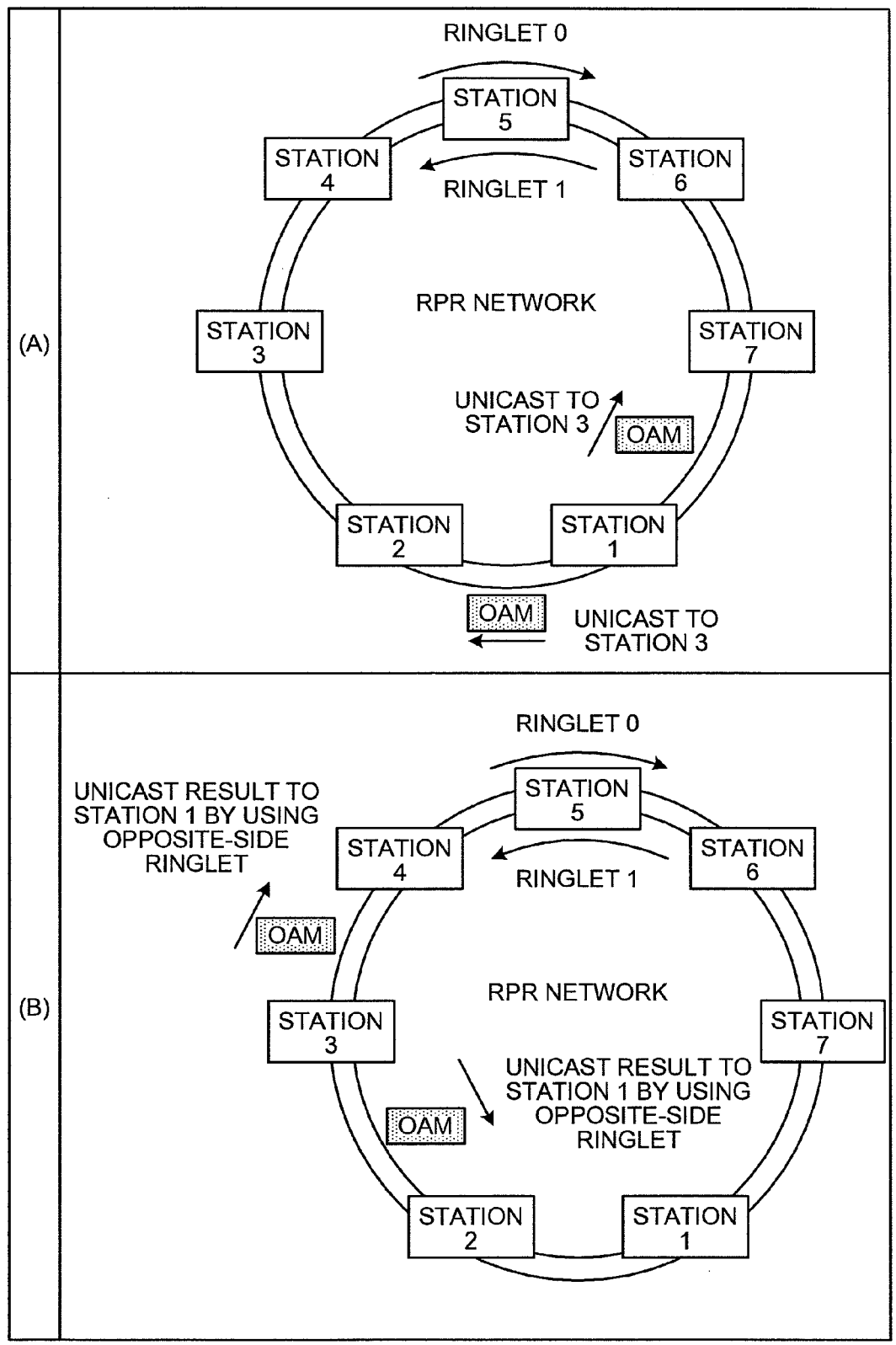
FIG. 20 is a diagram for explaining a switching candidate selecting section in the third embodiment.

FIG. 19 is a block diagram showing the configuration of the ringlet switching apparatus according to the third embodiment. FIG. 20 is a diagram for explaining a switching candidate selecting section in the third embodiment. FIG. 21 is a diagram for explaining a topology table section in the third embodiment. FIG. 22 is a diagram for explaining a ringlet selection table section after selecting the switching candidate in the third embodiment.

As shown in FIG. 19, the ringlet switching apparatus 10 according to the third embodiment is different from that according to the first embodiment in that it has a diagnostic result acquisition section 38. Hereinafter, the sections that perform operation different from that in the first embodiment, that is, the diagnostic result acquisition section 38 that is a primary focus of interest, the topology table section 21, the ringlet selection table section 22, the switching candidate selecting section 34, and the switching-back section 36 and the like will be explained.

The diagnostic result acquisition section 38 obtains the diagnostic result of the Pseudo-random Binary (Bit) Sequence pattern (PRBS pattern). Specifically, the diagnostic result acquisition section 38 transmits the PRBS pattern to the predetermined station for every ringlet, obtains the diagnostic result by the predetermined station for the transmitted PRBS pattern, and causes the topology table section 21 to store the obtained diagnostic result.

For example, the diagnostic result acquisition section 38 periodically performs a bit error diagnosis of the PRBS pattern by an OAM Organization Specific frame that is the frame for maintenance unique to a vendor. The diagnostic result acquisition section 38 embeds the created PRBS pattern into a payload section of the OAM frame, and transmits to the predetermined station for every ringlet (refer to the (A) of FIG. 20). At the predetermined station that has received the OAM frame, regardless of an FCS calculation result, the bit error diagnosis of the PRBS pattern (the bit error less than BER-SD is diagnosed and so on) is performed, and the diagnostic result is embedded in the OAM frame and is transmitted to the station of the originating station by using the opposite-side ringlet (refer to the (B) of FIG. 20). The diagnostic result acquisition section 38 receives the diagnostic result embedded in the OAM frame transmitted from the predetermined station, and obtains the diagnostic result. Incidentally, in the third embodiment, there has been explained the technique in which the station that has received the OAM frame transmits the diagnostic result to the originating station by using the opposite-side ringlet, but the present invention is not limited to this, and the present invention can be also applied similarly to the technique of transmitting the diagnostic result to the originating station using the ringlet under the diagnosis.

Accordingly, for example, as shown in FIG. 21, the topology table in the topology table section 21 updates "diagnostic result" information by the diagnostic result received from the diagnostic result acquisition section 38. In the description for the example of FIG. 21, the diagnostic result is stored in the "diagnostic result" corresponding to the "Station 3". This shows that the diagnostic result of the ringlet 0 is a "rejection" and the diagnostic result of the ringlet 1 is a "pass". Incidentally, in the third embodiment, the technique of updating the "diagnostic result" information by one count of the diagnostic result has been explained, but the present invention is not limited to this, and the present invention can be also applied similarly to the technique of updating the "diagnostic result" information, after checking multiple counts, such as three counts, of the diagnostic results.

When the topology table in the topology table section 21 is updated as shown in FIG. 21, the ringlet selection table in the ringlet selection table section 22 will be updated as shown in FIG. 22. That is, since the rejected result is obtained for the ringlet 0 with respect to the "Station 3", the switching candidate selecting section 34 selects the ringlet 1 not providing the rejected result with respect to the "Station 3", as the switching candidate having the higher frame transfer quality.

Moreover, in a manner similar to the first embodiment, the switching-back section 36 in the third embodiment switches back the ringlet for transferring the frame from the switching candidate to the fundamental ringlet, but unlike the first embodiment, when the diagnostic result of the fundamental ringlet is updated from the rejected result to the passed result, the switching-back section 36 switches back the ringlet for transferring the frame from the switching candidate to the fundamental ringlet.

Figure 23:
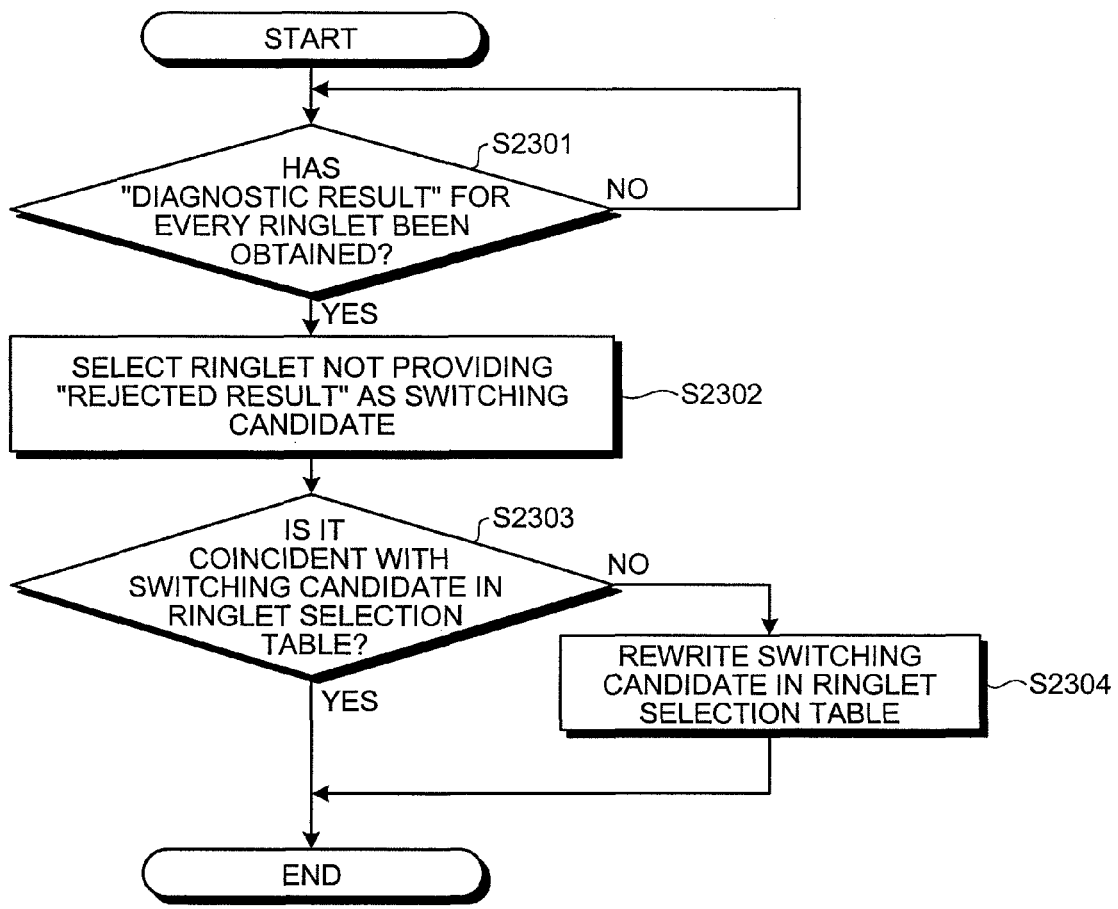
FIG. 23 is a flowchart showing a procedure of processing by the ringlet switching apparatus according to the third embodiment.

FIG. 23 is a flowchart showing a procedure of processing by the ringlet switching apparatus according to the third embodiment. Incidentally, since in the ringlet switching apparatus according to the third embodiment, the processing especially different from that in the first embodiment is the switching candidate selection processing, hereinafter, only the switching candidate selection processing will be explained.

First, the ringlet switching apparatus 10 according to the third embodiment determines whether the diagnostic result (the diagnostic result by the predetermined station for the transmitted PRBS pattern to the predetermined station) is obtained for every ringlet (step S2301). When the diagnostic result for every ringlet is not obtained (No at step S2301), the ringlet switching apparatus 10 returns to the process for determining whether the diagnostic result for every ringlet is obtained.

Meanwhile, when the diagnostic result for every ringlet is obtained (Yes at step S2301), the ringlet switching apparatus 10 selects the ringlet not providing the rejected result as the switching candidate (step S2302).

The ringlet switching apparatus 10 then determines, in a manner similar to the first embodiment, whether the selected switching candidate is coincident with the switching candidate in the ringlet selection table (step S2303), and when both are not coincident with each other (No at step S2303), the ringlet switching apparatus 10 rewrites the switching candidate in the ringlet selection table (step S2304) and completes the procedure.

As explained above, according to the third embodiment, the ringlet switching apparatus uses, as the information on the frame transfer quality for every ringlet, the diagnostic result by the predetermined station for the PRBS pattern transmitted to the predetermined station for every ringlet, and when the rejected result is obtained, as the diagnostic result, in one of the ringlets, the ringlet switching apparatus selects the ringlet not providing the rejected result as the switching candidate having the higher frame transfer quality with respect to the predetermined station, and thus appropriately selects the ringlet having the higher frame transfer quality (the ringlet for which the diagnostic result by the PRBS pattern is not the rejection), and switches to the selected ringlet at the appropriate timing (before the protection starting based on the specification of IEEE 802.17 is performed), so that as compared with the technique of independently performing the protection function based on the specification of IEEE 802.17, it is possible to decrease the frame discard.

Furthermore, according to the third embodiment, when the ringlet for currently transferring the frame is the switching candidate by switching the ringlet for transferring the frame from the fundamental ringlet to the switching candidate, if the diagnostic result of the fundamental ringlet is updated from the rejected result to the passed result, since the ringlet switching apparatus switches back the ringlet for transferring the frame from the switching candidate to the fundamental ringlet, the fundamental ringlet is selected when the frame transfer quality of the fundamental ringlet has been improved, so that it is possible to more appropriately select the ringlet having the higher frame transfer quality, and it is also possible to switch to the selected ringlet at the more appropriate timing.

Although the ringlet switching apparatuses according to the first embodiment to the third embodiment have been explained so far, the present invention may be implemented with various different forms other than the embodiments. Accordingly, a different embodiment will be hereinafter explained as the ringlet switching apparatus according to a fourth embodiment of the present invention.

Although in the embodiments, there has been explained the case in which the ringlet by Resilient Packet Ring (RPR) is premised as the double ringlet, but the present invention is not limited to this, and if it is the double ringlets in which stations are connected in the ring-type manner with the double paths for transferring the frames in the opposite directions, the present invention can be also applied similarly to a case in which the ringlet by any other technique besides the RPR is premised.

Furthermore, in the embodiments, the technique performing the switching from the fundamental ringlet to the switching candidate and in addition the switching-back from the switching candidate to the fundamental ringlet has been explained, but the present invention is not limited to this, and the present invention is also applied similarly to the technique of performing only the switching of the ringlet and not the switching-back of the ringlet.

Moreover, in each processing explained in the present embodiments, all or any part of processing explained as being automatically performed (for example, the creation processing of the topology table created automatically when the station has been connected to the ringlet, an so on) can be manually performed (for example, the creation processing is started by inputting a command that instructs the creation of topology table), or all or any part of processing explained as being manually performed can also be automatically performed by a well-known method. In addition, the information containing the processing procedure, the control procedure, the specific names, various kinds of data or parameters shown in the specification and drawings, unless otherwise specified, can be arbitrarily changed (for example, by deleting the steps S1004 and S1005 of FIG. 10, the switching candidate can be always rewritten).

Furthermore, each component of respective apparatuses shown in the drawings is functionally conceptual, and does not necessarily require the physical configuration shown in the drawings (for example, FIG. 2 or the like). That is, the specific form of distribution and integration of respective apparatuses is not limited to that shown in the drawings, but depending on various kinds of loads, use states, or the like, the specific form can be configured by performing functionally or physically the distribution or integration of all or any part of respective apparatuses by arbitrary units. Furthermore, for each processing function performed with each apparatus, all or any part thereof can be achieved by a CPU and a program analyzed and executed by the CPU, or can be achieved as hardware by wired logic.

Figure 24:
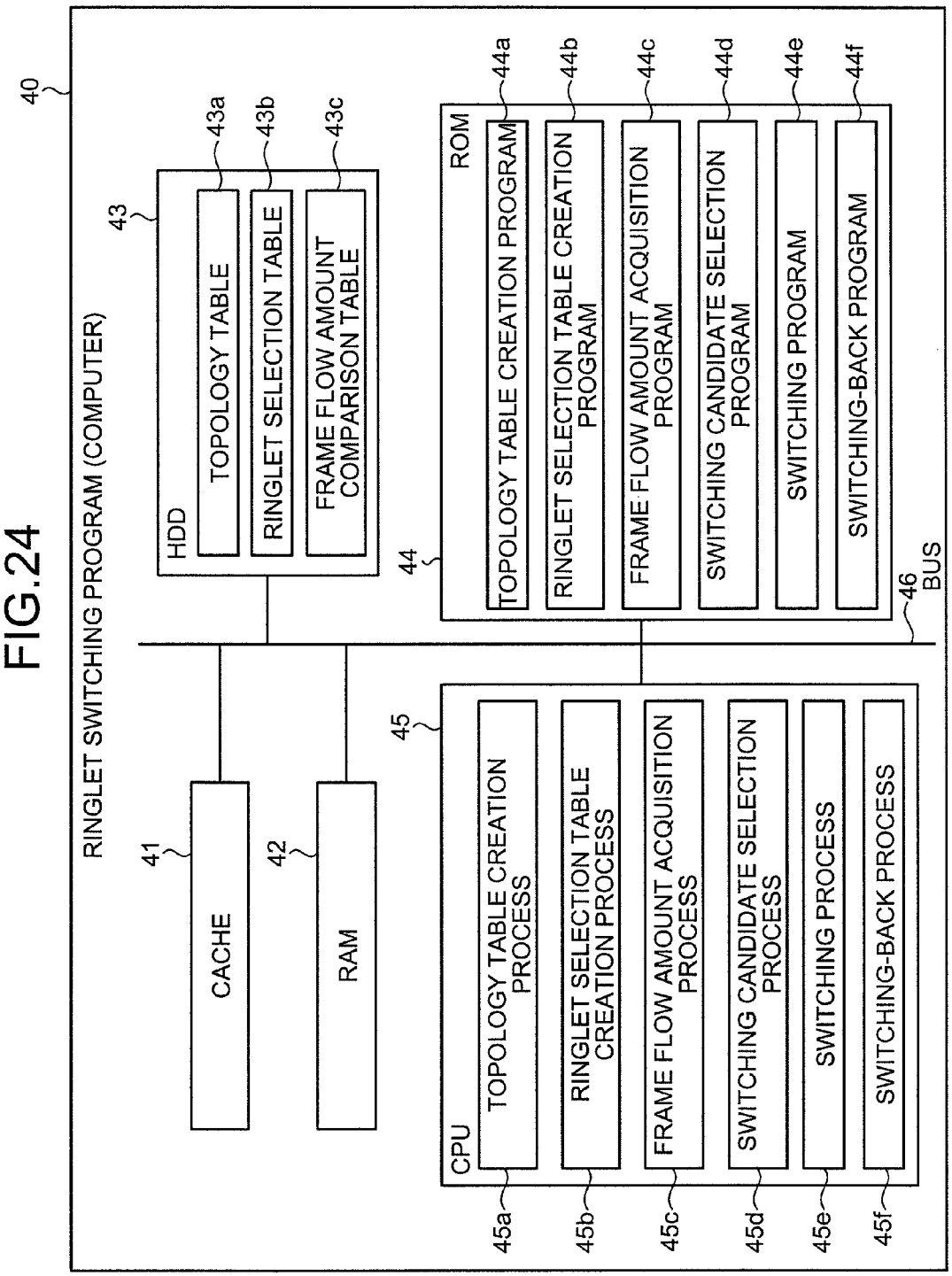
FIG. 24 is a diagram showing a computer for executing a ringlet switching program.
Figure 25:
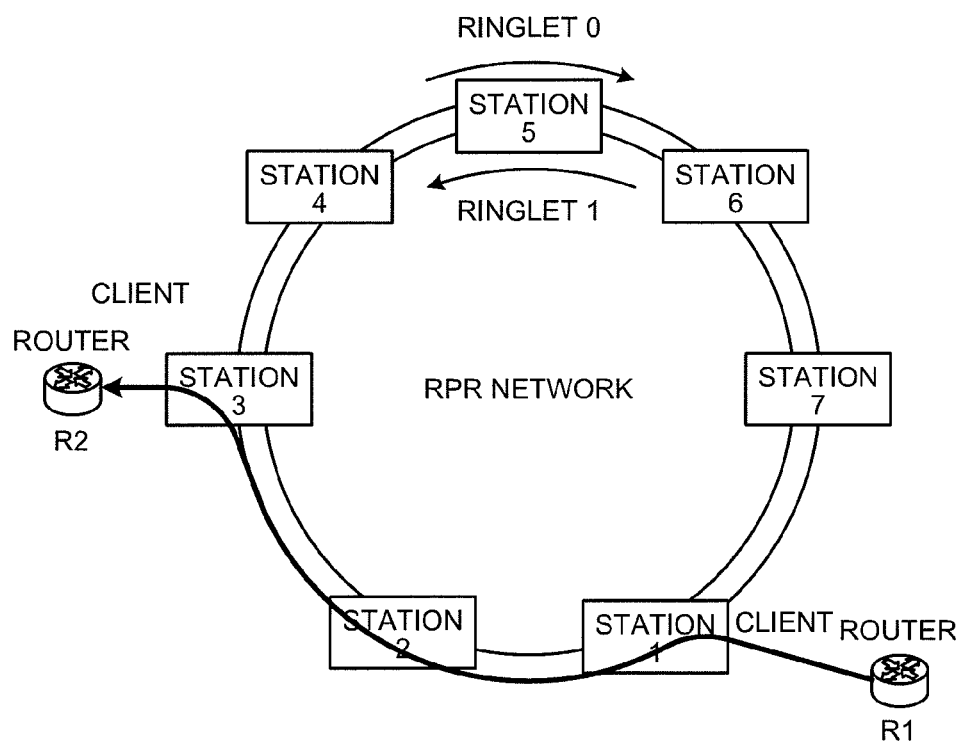
FIG. 25 is a diagram for explaining the conventional technology.

In various kinds of processing explained in the first embodiment, the program prepared in advance is usually controlled by the CPU in an onboard, but as alternative unit, can be also controlled externally by a computer, such as a personal computer, a workstation, or the like with the internal structure of FIG. 24. Thus, an example of the computer for executing the ringlet switching program, which has the same function as that in the first embodiment, will be hereinafter explained using FIG. 24. FIG. 24 is a diagram showing the computer for executing the ringlet switching program.

As shown in FIG. 24, a computer 40 for executing the ringlet switching program is configured by connecting a cache 41, a RAM 42, a HDD 43, a ROM 44, and a CPU 45 with a bus 46. Here, in the ROM 44, the ringlet switching program for performing a function similar to that in the first embodiment, that is, as shown in FIG. 24, including a topology table creation program 44a, a ringlet selection table creation program 44b, a frame flow rate acquisition program 44c, a switching candidate selection program 44d, a switching program 44e, and a switching-back program 44f is stored in advance.

The CPU 45 then reads and executes these programs 44a, 44b, 44c, 44d, 44e, and 44f, and as a result, as shown in FIG. 24, a topology table creation process 45a, a ringlet selection table creation process 45b, a frame flow rate acquisition process 45c, a switching candidate selection process 45d, a switching process 45e, and a switching-back process 45f are performed. Incidentally, respective processes 45a, 45b, 45c, 45d, 45e, and 45f correspond to the topology table creation section 31, the ringlet selection table creation section 32, the frame flow rate acquisition section 33, the switching candidate selecting section 34, the switching section 35, and the switching-back section 36 shown in FIG. 2, respectively.

Moreover, in the HDD 43, as shown in FIG. 24, a topology table 43a, a ringlet selection table 43b, and a frame flow rate comparison table 43c are provided. Incidentally, respective tables 43a, 43b, and 43c correspond to the topology table section 21, the ringlet selection table section 22, and the frame flow rate comparison table section 23 shown in FIG. 2, respectively.

It is not necessarily needed that the respective programs 44a, 44b, 44c, 44d, 44e, and 44f are stored in the ROM 44, they may be stored in, for example, "portable physical media" such as a flexible disk (FD), a CD-ROM, an MO disk, a DVD disk, a magneto-optical disk, and an IC card inserted in the computer 40, or "fixed physical media" such as a hard disk drive (HDD) provided inside or outside the computer 40, or further "another computer (or a server)" connected to the computer 40 through a public line, the Internet, a LAN, a WAN, or the like and the computer 40 may read and execute the program from these media.

Various kinds of processing explained in the second embodiment or third embodiment are also realized by executing the program prepared in advance with the computer such as the personal computer or a workstation. In this case, instead of the frame flow rate acquisition process 44c, a highly sensitive bit error information program, a diagnostic result acquisition program, or the like will be provided.

According to the conventional technologies, however, there have been problems that it is impossible to appropriately select the ringlet having higher frame transfer quality (the ringlet without the occurrence of congestion, the ringlet without the occurrence of the failure or the like) and to switch to the selected ringlet at appropriate timings (before the congestion occurs or before the failure occurs) as will be explained later.

Namely, according to the technique of selecting the ringlet having the fewer number of hops as specified by IEEE 802.17, when the frame transfer quality in the ringlet having the fewer number of hops is deteriorated, for example, the congestion occurs, the ringlet having the higher frame transfer quality (the ringlet without the occurrence of the congestion) cannot be appropriately selected. Incidentally, according to the technique described in Japanese Patent Application Laid-open No. 2005-354598, when the traffic amount of the ringlet having the fewer number of hops is not less than the threshold, the other ringlet will be selected, but even when the congestion is not actually caused, for example, when the traffic amount exceeds the threshold in a burst state, the other ringlet will be selected, so that it does not offer the technique of appropriately solving the problem described above.

In addition, according to the technique of selecting the ringlet so as not to pass through the section where the failures are caused as described in IEEE 802.17, the ringlet will be switched after the frame transfer quality is deteriorated (after the failure is caused), but to avoid the frame discard during the time is difficult, and thus it is impossible to switch to the selected ringlet at an appropriate timing.

As described above, according to one aspect of the present invention, it is possible to appropriately select a ringlet with higher frame transfer quality (ringlet without the occurrence of the congestion or ringlet without the occurrence of the failure) and to switch to the selected ringlet at the appropriate timing (before the congestion occurs or before the failure occurs).

Furthermore, according to another aspect of the present invention, not the fundamental ringlet but the other ringlet with a fewer frame flow rate is selected at the stage where the congestion may occur in a fundamental ringlet (a preceding stage of degradation), and the fundamental ringlet is selected at the stage where the congestion may not occur in the fundamental ringlet (a previous stage up to the preceding stage of degradation), so that it is possible to appropriately select the ringlet having the higher frame transfer quality from the viewpoint of an effective use of bandwidth or a congestion control, as compared with the conventional technique of selecting the fundamental ringlet (the ringlet having the fewer number of hops) regardless of the frame flow rate for every ringlet, and it is also possible to switch to the selected ringlet at the appropriate timing.

Moreover, according to still another aspect of the present invention, the ringlet having the higher frame transfer quality (the ringlet without a bit error) is appropriately selected, and the switching to the selected ringlet is performed at the appropriate timing, (before protection starting based on the specification of IEEE 802.17 is performed), so that it is possible to decrease frame discard as compared with the technique of independently performing a protection function based on the specification of IEEE 802.17.

Moreover, according to still another aspect of the present invention, the ringlet having the higher frame transfer quality (the ringlet for which the diagnostic result by the PRBS pattern is not a rejection) is appropriately selected, and the switching to the selected ringlet is performed at the appropriate timing, (before protection starting based on the specification of IEEE 802.17 is performed), so that it is possible to decrease frame discard as compared with the technique of independently performing the protection function based on the specification of IEEE 802.17.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ringlet switching apparatus that selects a ringlet for a station of a transfer destination of a frame and switches from a ringlet for transferring a frame to other ringlet in a station of double ringlets in which a plurality of stations are connected in a ring shape with double paths for bidirectionally transferring frames, the ringlet switching apparatus comprising:
   an obtaining unit that obtains a frame flow rate indicating an amount of a frame transferred per unit time;
   a determining unit that determines whether a ringlet used for transferring the frame is in a preceding stage of a degradation of the frame transfer quality based on the frame flow rate for the ringlet used for transferring the frame obtained by the obtaining unit;
   a switching candidate selecting unit that obtains an increasing trend for each ringlet indicated by a difference between two frame flow rates obtained by the obtaining unit at two different times and selects a ringlet having a low increasing trend than other ringlet as a switching candidate for each station of the transfer destination; and
   a switching unit that switches a ringlet for transferring the frame to the station of the transfer destination from the ringlet used to the switching candidate selected by the switching candidate selecting unit when the determining unit determines that the ringlet used is in the preceding state and the ringlet used is different from the switching candidate selected.

2. The ringlet switching apparatus according to claim 1, wherein
   the ringlet used for transferring a frame is a fundamental ringlet that is a ringlet having a smaller station count to the transfer destination than other ringlet and the switching candidate selecting unit uses a frame flow rate indicating an amount of frames transferred per unit time as the information on the frame transfer quality for each ringlet, compares an increasing trend of the frame flow rate between ringlets, and selects a ringlet with a low increasing trend as the switching candidate, and
   the switching unit determines that the fundamental ringlet is in the preceding stage of the degradation of the frame transfer quality if a proportion of the frame flow rate with respect to a capacity of the fundamental ringlet exceeds a first threshold.

3. The ringlet switching apparatus according to claim 2, further comprising a switching-back unit that switches back, when the switching candidate is currently transferring the frame as a result of switching the ringlet for transferring the frame from the fundamental ringlet to the switching candidate by the switching unit, and when a comparison of the decreasing trend of the frame flow rate between the ringlets shows that the fundamental ringlet has a high decreasing trend, if the proportion of the frame flow rate with respect to the capacity of the fundamental ringlet is below a second threshold, the ringlet for transferring the frame from the switching candidate to the fundamental ringlet.

4. The ringlet switching apparatus according to claim 1, wherein the switching candidate selecting unit uses bit error information indicating that a bit error less than bit error rate-signal degrade is detected as the information on the frame transfer quality for each ringlet, and when the bit error information is obtained from a predetermined station of any one of the ringlets, selects a ringlet from which the bit error information is not obtained as the switching candidate.

5. The ringlet switching apparatus according to claim 4, further comprising a switching-back unit that switches back, when the switching candidate is currently transferring the frame as a result of switching the ringlet for transferring the frame from the fundamental ringlet to the switching candidate by the switching unit, and when the bit error information obtained from a predetermined station of the fundamental ringlet is updated to error free information indicating that there is no error, the ringlet for transferring the frame from the switching candidate to the fundamental ringlet.

6. The ringlet switching apparatus according to claim 1, wherein the switching candidate selecting unit uses a diagnostic result by a predetermined station for a pseudo-random binary sequence pattern transmitted to the predetermined station for each ringlet as the information on the frame transfer quality for every ringlet, and when a rejected result is obtained in any one of the ringlets as the diagnostic result, selects a ringlet from which the rejected result is not obtained as the switching candidate.

7. The ringlet switching apparatus according to claim 6, further comprising a switching-back unit that switches back, when the switching candidate is currently transferring the frame as a result of switching the ringlet for transferring the frame from the fundamental ringlet to the switching candidate by the switching unit, and when a diagnostic result of the fundamental ringlet is updated from the rejected result to a passed result, the ringlet for transferring the frame from the switching candidate to the fundamental ringlet.

8. A ringlet switching method of selecting a ringlet for a station of a transfer destination of a frame and switching from a ringlet for transferring a frame to other ringlet in a station of double ringlets in which a plurality of stations are connected in a ring shape with double paths for bidirectionally transferring frames, the ringlet switching method comprising:

obtaining a frame flow rate indicating an amount of a frame transferred per unit time;

determining whether a ringlet used for transferring the frame is in a preceding stage of a degradation of the frame transfer quality based on the frame flow rate for the ringlet used for transferring the frame obtained at the obtaining;

obtaining an increasing trend for each ringlet indicated by a difference between two frame flow rates obtained at the obtaining at two different times;

selecting a ringlet having a low increasing trend than other ringlet as a switching candidate for each station of the transfer destination; and switching a ringlet for transferring the frame to the station of the transfer destination from the ringlet used to the switching candidate selected at the selecting when the determining determines that the ringlet used is in the preceding state and the ringlet used is different from the switching candidate selected.

9. A computer-readable recording medium that stores therein a computer program for selecting a ringlet for a station of a transfer destination of a frame and switching from a ringlet for transferring a frame to other ringlet in a station of double ringlets in which a plurality of stations are connected in a ring shape with double paths for bidirectionally transferring frames, the computer program causing a computer to execute:

obtaining a frame flow rate indicating an amount of a frame transferred per unit time;

determining whether a ringlet used for transferring the frame is in a preceding stage of a degradation of the frame transfer quality based on the frame flow rate for the ringlet used for transferring the frame obtained at the obtaining;

obtaining an increasing trend for each ringlet indicated by a difference between two frame flow rates obtained at the obtaining at two different times;

selecting a ringlet having a low increasing trend than other ringlet as a switching candidate for each station of the transfer destination; and switching a ringlet for transferring the frame to the station of the transfer destination from the ringlet used to the switching candidate selected at the selecting when the determining determines that the ringlet used is in the preceding state and the ringlet used is different from the switching candidate selected.

* * * * *